US011917635B2

United States Patent
Maleki et al.

(10) Patent No.: US 11,917,635 B2
(45) Date of Patent: Feb. 27, 2024

(54) NETWORK NODE, USER EQUIPMENT (UE), AND ASSOCIATED METHODS FOR SCHEDULING OF THE UE BY THE NETWORK NODE

(71) Applicant: Telefonaktiebolaget LM Ericsson (publ), Stockholm (SE)

(72) Inventors: Sina Maleki, Malmö (SE); Ajit Nimbalker, Fremont, CA (US); Ali Nader, Malmö (SE); Andres Reial, Lomma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 320 days.

(21) Appl. No.: 17/433,129

(22) PCT Filed: Apr. 2, 2020

(86) PCT No.: PCT/SE2020/050343
§ 371 (c)(1),
(2) Date: Aug. 23, 2021

(87) PCT Pub. No.: WO2020/204800
PCT Pub. Date: Oct. 8, 2020

(65) Prior Publication Data
US 2022/0159700 A1      May 19, 2022

Related U.S. Application Data

(60) Provisional application No. 62/828,218, filed on Apr. 2, 2019.

(51) Int. Cl.
*H04W 72/23* (2023.01)
*H04W 72/12* (2023.01)

(52) U.S. Cl.
CPC .......... *H04W 72/23* (2023.01); *H04W 72/12* (2013.01)

(58) Field of Classification Search
CPC . H04W 72/23; H04W 72/12; H04W 72/0446; Y02D 30/70
See application file for complete search history.

(56) References Cited

U.S. PATENT DOCUMENTS

2014/0029569 A1    1/2014  Ni
2016/0323870 A1   11/2016  Wei et al.
(Continued)

FOREIGN PATENT DOCUMENTS

CN    101222269 A    7/2008
CN    102761968 A   10/2012
(Continued)

OTHER PUBLICATIONS

3GPP, "3GPP TS 38.214 V15.0.0", 3rd Generation Partnership Project; Technical Specification Group Radio Access Network; NR; Physical layer procedures for data (Release 15), Dec. 2017, 1-71.
(Continued)

*Primary Examiner* — Syed Ali
(74) *Attorney, Agent, or Firm* — Murphy, Bilak & Homiller, PLLC

(57) ABSTRACT

Embodiments include methods, performed by a network node in a wireless network, for managing energy consumption of user equipment (UEs) served by the network node. Such methods include transmitting, to a UE, a configuration including one or more time-domain resource allocations (TDRAs). The TDRAs include one or more first scheduling offsets and one or more second scheduling offsets between a scheduling message and a signal or channel scheduled via the scheduling message. A minimum value of the second scheduling offsets is greater than a minimum value of the
(Continued)

first scheduling offsets. Such methods also include transmitting, to the UE, an indication of whether the UE should use the first scheduling offsets or the second scheduling offsets, and a first scheduling message that schedules a first signal or channel for the UE according to the indication. Embodiments also include complementary methods perform by UEs, as well as network nodes and UEs.

24 Claims, 12 Drawing Sheets

(56) References Cited

U.S. PATENT DOCUMENTS

| | | | |
|---|---|---|---|
| 2017/0164384 | A1 | 6/2017 | Wang et al. |
| 2017/0170914 | A1 | 6/2017 | Saha |
| 2019/0082431 | A1* | 3/2019 | Yi ..................... H04W 72/0446 |
| 2019/0090299 | A1 | 3/2019 | Ang et al. |
| 2019/0166611 | A1* | 5/2019 | Noh .................. H04W 72/1273 |
| 2019/0174466 | A1* | 6/2019 | Zhang .................. H04L 5/0057 |
| 2019/0174535 | A1 | 6/2019 | Li et al. |
| 2019/0342907 | A1* | 11/2019 | Huang .................. H04W 72/23 |
| 2020/0229156 | A1* | 7/2020 | Park ..................... H04L 5/0094 |
| 2020/0314747 | A1* | 10/2020 | Zhou .................... H04L 5/0053 |
| 2022/0029746 | A1* | 1/2022 | Noh ........................ H04B 7/024 |
| 2023/0069144 | A1* | 3/2023 | Wang .................... H04L 5/0055 |

FOREIGN PATENT DOCUMENTS

| | | |
|---|---|---|
| CN | 104754763 A | 7/2015 |
| EP | 2882249 A1 | 6/2015 |
| RU | 2663225 C1 | 8/2018 |
| WO | 2018027818 A1 | 2/2018 |

OTHER PUBLICATIONS

3GPP, "3GPP TS 38.211 V15.5.0", 3rd Generation Partnership Project; Technical Specification Group Radio Access Network; NR; Physical channels and modulation (Release 15), Mar. 2019, 1-96.

3GPP, "3rd Generation Partnership Project; Technical Specification Group Radio Access Network; Evolved Universal Terrestrial Radio Access (E-UTRA); Physical layer procedures (Release 13)", 3GPP TS 36.213 V13.2.0, Jun. 2016, 1-381.

3GPP, "3rd Generation Partnership Project; Technical Specification Group Radio Access Network; николайNR; Physical channels and modulation (Release 15)", 3GPP TS 38.211 V15.0.0, Dec. 2017, 1-73.

3GPP, "3rd Generation Partnership Project; Technical Specification Group Radio Access Network; NR; Physical layer procedures for data (Release 15)", 3GPP TS 38.214 V15.5.0, Mar. 2019, 1-103.

3GPP, "3rd Generation Partnership Project; Technical Specification Group Radio Access Network; NR; Physical layer procedures for data (Release 15)", 3GPP TS 38.214 V15.4.0, Dec. 2018, 1-102.

3GPP, "3rd Generation Partnership Project; Technical Specification Group Radio Access Network; NR; Radio Resource Control (RRC) protocol specification (Release 15)", TS 38.331 V15.4.0, Dec. 2018, 1-474.

3GPP, "3rd Generation Partnership Project; Technical Specification Group Radio Access Network; Study on new radio access technology: Radio access architecture and interfaces (Release 14)", 3GPP TR 38.801 V14.0.0, Mar. 2017, 1-91.

Ericsson, "Procedure for cross-slot scheduling technique", 3GPP TSG-RAN WG1#96, Tdoc R1-1905467, Xi'an, China, Apr. 8-12, 2019, 1-6.

Oppo, "UE Adaptation to the Traffic and UE Power Consumption", 3GPP TSG RAN WG1 #96, R1-1902745, Athens, Greece, Feb. 25-Mar. 1, 2019, 1-14.

Qualcomm Incorporated, "Potential Techniques for UE Power Saving", 3GPP TSG-RAN WG1 #96, R1-1903016, Athens, Greece, Feb. 25-Mar. 1, 2019, 1-33.

3GPP, "3rd Generation Partnership Project; Technical Specification Group Services and System Aspects; System Architecture for the 5G System; Stage 2 (Release 15)", 3GPP TS 23.501 V15.5.0, Mar. 2019, pp. 1-241.

3GPP, "3GPP TS 38.300 V15.5.0", 3rd Generation Partnership Project; Technical Specification Group Radio Access Network; NR; NR and NG-RAN Overall Description; Stage 2 (Release 15), Mar. 2019, 1-97.

* cited by examiner

```
-- ASN1START
PDSCH-TimeDomainResourceAllocationList ::=   SEQUENCE (SIZE(1..maxNrofDL-Allocations)) OF
                                                 PDSCH-TimeDomainResourceAllocation PDSCH-TimeDomainResourceAllocation ::=   SEQUENCE {
    k0                      INTEGER(0..32)              OPTIONAL,      -- Need S
    mappingType             ENUMERATED {typeA, typeB},
    startSymbolAndLength    INTEGER (0..127)
}
-- ASN1STOP
```

FIG. 10A

```
-- ASN1START
PUSCH-TimeDomainResourceAllocationList ::=   SEQUENCE (SIZE(1..maxNrofUL-Allocations)) OF
                                                 PUSCH-TimeDomainResourceAllocation PUSCH-TimeDomainResourceAllocation ::=   SEQUENCE {
    k2                      INTEGER(0..32)              OPTIONAL,      -- Need S
    mappingType             ENUMERATED {typeA, typeB},
    startSymbolAndLength    INTEGER (0..127)
}
-- ASN1STOP
```

FIG. 10B

```
-- ASN1START
PDSCH-TimeDomainResourceAllocationListCross ::=   SEQUENCE (SIZE(1..maxNrofDL-Allocations)) OF
                                                      PDSCH-TimeDomainResourceAllocationCross PDSCH-TimeDomainResourceAllocationCross ::=   SEQUENCE {
    k0                      INTEGER(1..32)              OPTIONAL,      -- Need S
    mappingType             ENUMERATED {typeA, typeB},
    startSymbolAndLength    INTEGER (0..127)
}
-- ASN1STOP
```

FIG. 11

FIG. 12
```
-- ASN1START
PDSCH-ConfigCommon ::=            SEQUENCE {
    pdsch-TimeDomainAllocationList         PDSCH-TimeDomainResourceAllocationList           OPTIONAL,    -- Need R
    pdsch-TimeDomainAllocationListCross    PDSCH-TimeDomainResourceAllocationListCross      OPTIONAL,    -- Need R
    ...
}
-- ASN1STOP
```

FIG. 13
```
-- ASN1START
PDSCH-TimeDomainResourceAllocationList ::=  SEQUENCE (SIZE(1..maxNrofDL-Allocations)) OF
                                            SEQUENCE {
                                                PDSCH-TimeDomainResourceAllocation
                                                PDSCH-TimeDomainResourceAllocationCross
                                            }

PDSCH-TimeDomainResourceAllocation ::=      SEQUENCE {
    k0                                          INTEGER(0..32)               OPTIONAL,       -- Need S
    mappingType                                 ENUMERATED {typeA, typeB},
    startSymbolAndLength                        INTEGER (0..127)
}

PDSCH-TimeDomainResourceAllocationCross ::= SEQUENCE {
    k0                                          INTEGER(1..32)               OPTIONAL,       -- Need S
    mappingType                                 ENUMERATED {typeA, typeB},
    startSymbolAndLength                        INTEGER (0..127)
}
-- ASN1STOP
```

FIG. 14
```
-- ASN1START
PDSCH-TimeDomainResourceAllocationList ::=  SEQUENCE (SIZE(1..maxNrofDL-Allocations)) OF
                                            PDSCH-TimeDomainResourceAllocation PDSCH-TimeDomainResourceAllocation ::=      SEQUENCE {
    k0                                          INTEGER(0..32)               OPTIONAL,       -- Need S
    k0_cross                                    INTEGER(1..32)               OPTIONAL,       -- Need S
    mappingType                                 ENUMERATED {typeA, typeB},
    startSymbolAndLength                        INTEGER (0..127)
}
-- ASN1STOP
```

NETWORK NODE, USER EQUIPMENT (UE), AND ASSOCIATED METHODS FOR SCHEDULING OF THE UE BY THE NETWORK NODE

TECHNICAL FIELD

The present invention generally relates to wireless communication networks, and particularly relates to a network node, user equipment and methods performed therein for scheduling of the user equipment by the network node in order to achieve improvements to user equipment (UE) energy consumption when operating in such networks.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. The present disclosure relates generally to NR, but the following description of Long-Term Evolution (LTE) technology is provided for context since it shares many features with NR.

LTE is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

3GPP LTE Rel-10 supports bandwidths larger than 20 MHz. One important requirement on Rel-10 is to assure backward compatibility with LTE Rel-8. This should also include spectrum compatibility. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. Similarly, one of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 116 served by eNBs 105, 110, and 115, respectively.

The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)-labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols.

FIG. 2B illustrates a block diagram of an exemplary Control (C)-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the DE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel on PDCCH for pages from the EPC via eNB. A UE in RRC_IDLE state is known in the EPC and has an assigned IP address, but is not known to the serving eNB (e.g., there is no stored context).

Logical channel communications between a UE and an eNB are via radio bearers. Since LTE Rel-8, signaling radio bearers (SRBs) SRB0, SRB1, and SRB2 have been available for the transport of RRC and NAS messages. SRB0 is used for RRC connection setup, RRC connection resume, and RRC connection re-establishment. Once any of these operations has succeeded, SRB1 is used for handling RRC messages (which may include a piggybacked NAS message) and for NAS messages prior to establishment of SRB2. SRB2 is used for NAS messages and lower-priority RRC messages (e.g., logged measurement information). SRB0 and SRB1 are also used for establishment and modification of data radio bearers (DRBs) for carrying user data between the UE and eNB.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 slots, labelled 0 through 19, each with a fixed duration of 0.5 ms. A 1-ms subframe comprises two consecutive slots where subframe i consists of slots $2i$ and $2i+1$. Each exemplary DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description. An exemplary uplink slot can be configured in similar manner as discussed above, but comprising $N^{UL}_{symb}$ OFDM symbols, each of which includes $N_{sc}$ subcarriers.

A combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ subcarriers over the duration of a slot (i.e., $N^{DL}_{symb}$ symbols), where $N^{RB}_{sc}$ is typically either 12 (with a 15-kHz SCS) or 24 (7.5-kHz SCS). The configuration of 15-kHz SCS and "normal" CP is often referred to as the numerology, μ.

In general, an LTE physical channel corresponds to a set of REs carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals (e.g., channel state information reference signals, CSI-RS), synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI) including scheduling information for DL messages on PDSCH, grants for UL transmission on PUSCH, and channel quality feedback (e.g., CSI) for the UL channel PHICH carries HARQ feedback (e.g., ACK/NAK) for UL transmissions by the UEs.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information (UCI) including HARQ feedback for eNB DL transmissions, channel quality feedback (e.g., CSI) for the DL channel, scheduling requests (SRs), etc. PRACH is used for random access preamble transmission.

Within the LTE DL, certain REs within each LTE subframe are reserved for the transmission of reference signals, such as DM-RS mentioned above. Other DL reference signals include cell-specific reference signals (CRS), positioning reference signals (PRS), and CSI reference signals (CSI-RS). UL reference signals include DM-RS and SRS mentioned above. Other RS-like DL signals include Primary Synchronization Sequence (PSS) and Secondary Synchronization Sequence (SSS), which facilitate the UEs time and frequency synchronization and acquisition of system parameters (e.g., via PBCH).

In LTE, UL and DL data transmissions (e.g., on PUSCH and PDSCH, respectively) can take place with or without an explicit grant or assignment of resources by the network (e.g., eNB). In general, UL transmissions are usually referred to as being "granted" by the network (i.e., "UL grant"), while DL transmissions are usually referred to as taking place on resources that are "assigned" by the network (i.e., "DL assignment").

In case of a transmission based on an explicit grant/assignment, downlink control information (DCI) is sent to the UE informing it of specific radio resources to be used for the transmission. In contrast, a transmission without an explicit grant/assignment is typically configured to occur with a defined periodicity. Given a periodic and/or recurring UL grant and/or DL assignment, the UE can then initiate a data transmission and/or receive data according to a predefined configuration. Such transmissions can be referred to as semi-persistent scheduling (SPS), configured grant (CG), or grant-free transmissions.

The fifth-generation (5G) NR technology shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. As another example, NR RRC layer includes RRC_IDLE and RRC_CONNECTED states, but adds an additional state known as RRC_INACTIVE, which has some properties similar to a "suspended" condition used in LTE.

In addition to providing coverage via "cells," as in LTE, NR networks also provide coverage via "beams." In general, a DL "beam" is a coverage area of a network-transmitted RS that may be measured or monitored by a UE. In NR, for example, such RS can include any of the following, alone or in combination: SS/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

Furthermore, time-frequency resources can be configured much more flexibly for an NR cell than for an LTE cell. For example, rather than a fixed 15-kHz SCS as in LTE, NR SCS can range from 15 to 240 kHz, with even greater SCS considered for future NR releases. In both LTE and NR, a UE in RRC_CONNECTED state monitors PDCCH for DL scheduling assignments (e.g., for PDSCH), UL resource grants (e.g., for PUSCH), and for other purposes. Depending on discontinuous reception (DRX) configuration, in both LTE and NR, a UE may spend a substantial part of its energy on decoding PDCCH without detecting a DL scheduling assignment or UL resource grant directed to it. Accordingly, techniques that can reduce unnecessary PDCCH monitoring, allow a UE to go to sleep more often and/or for longer periods, or allow a UE to wake up less frequently and/or for shorter periods can be beneficial.

SUMMARY

Embodiments of the present disclosure provide specific improvements to communication between user equipment (UE) and network nodes in a wireless communication network, such as by facilitating solutions to overcome the exemplary problems summarized above and described in more detail below.

Some exemplary embodiments include methods (e.g., procedures) for scheduling user equipment (UEs) served by a network node, according to various exemplary embodiments of the present disclosure. These exemplary methods can be performed by a network node (e.g., base station, eNB, gNB, etc., or component thereof) serving one or more UEs in a cell of a wireless network (e.g., E-UTRAN, NG-RAN).

These exemplary methods can include transmitting, to the UE, a configuration including one or more time-domain resource allocations (TDRAs). The TDRAs can include one or more first scheduling offsets and one or more second scheduling offsets between a scheduling message and a signal or channel scheduled via the scheduling message. A second minimum value of the one or more second scheduling offsets can be greater than a first minimum value of the one or more first scheduling offsets.

These exemplary methods can also include subsequently transmitting, to the UE, an indication of whether the UE should use the first scheduling offsets or the second scheduling offsets, and a first scheduling message that schedules a first signal or channel for the UE according to the indication. In some embodiments, these exemplary methods can also include transmitting or receiving the first signal or channel at one of the first scheduling offsets or one of the second scheduling offsets after transmitting the first scheduling message, in accordance with the indication.

In some embodiments, the configuration can be transmitted in a radio resource control (RRC) message and the first scheduling message can be transmitted as downlink control information (DCI) in a physical downlink control channel (PDCCH). In such embodiments, the indication can be transmitted according to any of the following:
  in a separate bit field in the DCI;
  as part of a TDRA field in the DCI;
  as indicated by a DCI format used for the DCI;
  as indicated by a type of identifier included in the DCI or the PDCCH carrying the first scheduling message;
  as indicated by a PDCCH search space in which the first scheduling message is transmitted;
  as indicated by a bandwidth part (BWP) in which the first scheduling message is transmitted;
  in a further DCI that does not include a scheduling message for the UE;
  in a medium access control (MAC) control element (CE); or
  in a further RRC message.

In some of these embodiments, the identifier (e.g., included in the DCI or PDCCH) can be a radio network temporary identifier (RNTI) used to scramble a cyclic redundancy check (CRC) of the DCI. In such case, a paging RNTI (P-RNTI) can indicate that the UE should use the second scheduling offsets, and a non-paging RNTI can indicate that the UE should use the first scheduling offsets.

In some embodiments, the configuration of the TDRAs can include a first list of a plurality of first TDRAs including a respective plurality of scheduling offsets from the first scheduling offsets; and a second list of a plurality of second TDRAs including a respective plurality of scheduling offsets from the second scheduling offsets. In such embodiments, the indication can indicate whether the first list or the second list should be used, and the first scheduling message can indicate a particular TDRA within the indicated list.

In other embodiments, the configuration of the TDRAs can include a third list of a plurality of TDRA fields, and the TDRA fields in the third list can include respective first TDRAs including respective scheduling offsets from the first scheduling offsets, and respective second TDRAs including respective scheduling offsets from the second scheduling offsets. In such embodiments, the indication can indicate, for all TDRA fields in the third list, whether the first TDRAs or the second TDRAs should be used, and the first scheduling message can indicate a particular TDRA field in the third list.

In other embodiments, the configuration of the TDRAs can include a fourth list of a plurality of TDRAs, and the TDRAs in the fourth list can include respective scheduling offsets from the first scheduling offsets and respective scheduling offsets from the second scheduling offsets. In such embodiments, the indication can indicate, for all TDRAs in the fourth list, whether the first scheduling offsets or the second scheduling offsets should be used, and the first scheduling message can indicate a particular TDRA in the fourth list.

In some embodiments, each first scheduling offset can comprise one or more symbols in a same slot as a scheduling message, and each second scheduling offset can comprise two or more symbols in a same slot as a scheduling message.

In other embodiments, the first scheduling offsets and the second scheduling offsets can be in units of slots, with the second minimum value (i.e., of the second scheduling offsets) being greater than a threshold and the first minimum value (i.e., of the first scheduling offsets) being less than or equal to the threshold. In various embodiments, the threshold can be zero or a parameter value included in the transmitted configuration.

In some of these embodiments, the first scheduling message can include a TDRA index value that corresponds to a particular first scheduling offset and to a particular second scheduling offset. In such embodiments, the TDRA index value can also correspond to a start and length indicator value, SLIV, associated with both the particular first scheduling offset and the particular second scheduling offset. Alternatively, the TDRA index value can correspond to a first SLIV associated with the particular first scheduling offset, and to a second SLIV associated with the particular second scheduling offset.

In some embodiments, the second scheduling offsets can be a subset of the first scheduling offsets. In such embodiments, the indication can activate or deactivate the portion of the first scheduling offsets other than the second scheduling offsets.

In various embodiments, the one or more first scheduling offsets and the one or more second scheduling offsets, included in the configuration, can be one of the following:
respective K0 offsets between a scheduling message and a physical downlink shared channel (PDSCH) transmission scheduled by the scheduling message;
respective K2 offsets between a scheduling message and a physical uplink shared channel (PUSCH) transmission scheduled by the scheduling message; and
respective aperiodic triggering offsets between a scheduling message and a channel state information reference signal (CSI-RS) transmission scheduled by the scheduling message.

In some embodiments, the indication can indicate that the UE should use the second scheduling offsets, and the configuration can also identify a period following the indication during which the UE should use the second scheduling offsets and after which the UE should use the first scheduling offsets if a further scheduling message has not been received by the UE.

In some embodiments, these exemplary methods can also include determining whether the UE should use the first scheduling offsets or the second scheduling offsets based on an amount of data needing to be transmitted to, or received from, the UE. In such embodiments, the indication can be based on this determination.

In some embodiments, these exemplary methods can also include, after transmitting or receiving the first signal or channel, transmitting a further indication that the UE should use the other of the first and second scheduling offsets, than indicated by the indication, for transmitting or receiving a second signal or channel scheduled by a second scheduling message. For example, if the indication indicated that the UE should use the first scheduling offsets, the further indication can indicate that the UE should use the second scheduling offsets.

Other exemplary embodiments include methods (e.g., procedures) performed by a user equipment configured for operation in a wireless network. For example, these exemplary methods can be performed by a user equipment (e.g., UE, wireless device, IoT device, modem, etc. or component thereof) served by a network node (e.g., base station, eNB, gNB, etc., or component thereof) in the wireless network (e.g., E-UTRAN, NG-RAN).

These exemplary methods can include receiving, from a network node serving the UE in the wireless network, a configuration including one or more time-domain resource allocations (TDRAs). The one or more TDRAs can include one or more first scheduling offsets and one or more second scheduling offsets between a scheduling message and a signal or channel scheduled via the scheduling message. A second minimum value of the one or more second scheduling offsets can be greater than a first minimum value of the one or more first scheduling offsets.

These exemplary methods can also include subsequently receiving, from the network node, an indication of whether the UE should use the one or more first scheduling offsets or the one or more second scheduling offsets, and a first scheduling message that schedules a first signal or channel for the UE according to the indication. In some embodiments, these exemplary methods can also include receiving or transmitting the first signal or channel at one of the first scheduling offsets or one of the second scheduling offsets after receiving the first scheduling message, in accordance with the indication.

According to various embodiments, the configuration, the indication, and the first scheduling message received by the UE can have substantially identical characteristics as described above in relation to such information being transmitted by the network node. In this manner, features of UE-related embodiments can be complementary to features of network node-related embodiments.

Other embodiments include network nodes (e.g., base stations, eNBs, gNBs, etc., or components thereof) or user equipment (UEs, e.g., wireless devices, IoT devices, modems, etc. or components thereof) configured to perform operations corresponding to any of the exemplary methods described herein. Other embodiments include non-transitory, computer-readable media storing program instructions that, when executed by processing circuitry, configure and/or cause such network nodes or such UEs to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 7, which includes

FIGS. 10A and 10B show exemplary ASN.1 data structures for PDSCHTimeDomain-ResourceAllocationList and PUSCH-TimeDomainResourceAllocationList information element (IEs) used for radio resource control (RRC), respectively.

FIGS. 11-14 show various exemplary ASN.1 data structures for various RRC IEs, according to various exemplary embodiments of the present disclosure.

DETAILED DESCRIPTION

Figure 1:
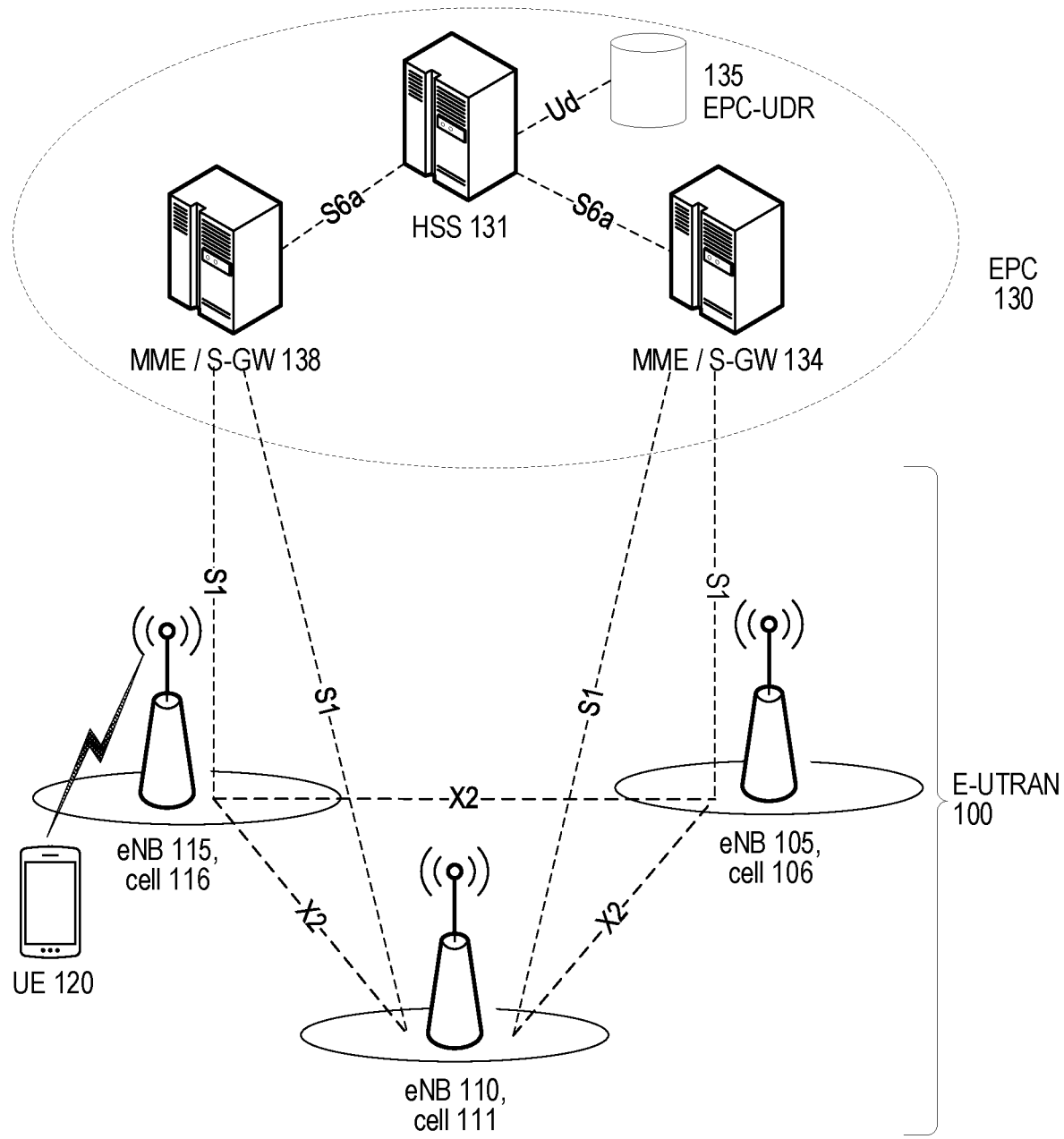
FIG. 1 is a high-level block diagram of an exemplary architecture of the Long-Term Evolution (LTE) Evolved UTRAN (E-UTRAN) and Evolved Packet Core (EPC) network, as standardized by 3 GPP.
Figure 2A:
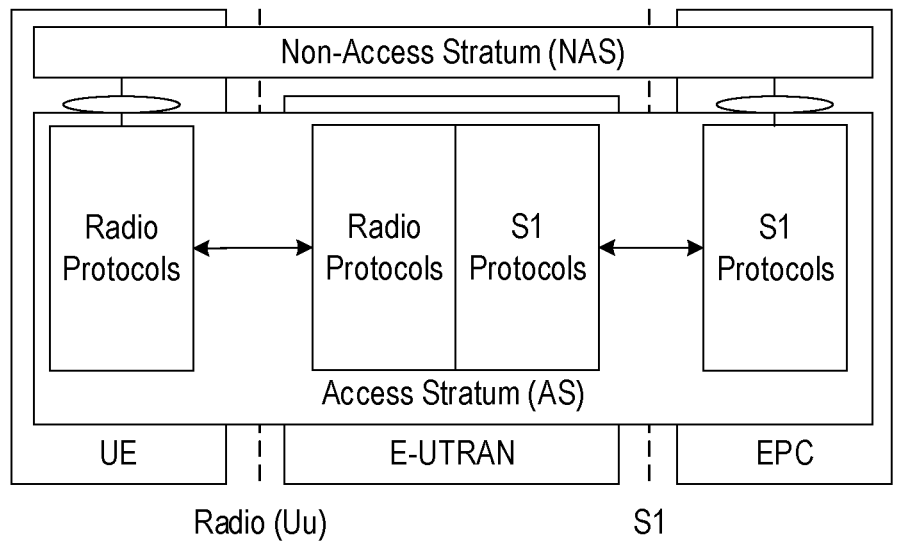
FIG. 2A is a high-level block diagram of an exemplary E-UTRAN architecture in terms of its constituent components, protocols, and interfaces.
Figure 2B:
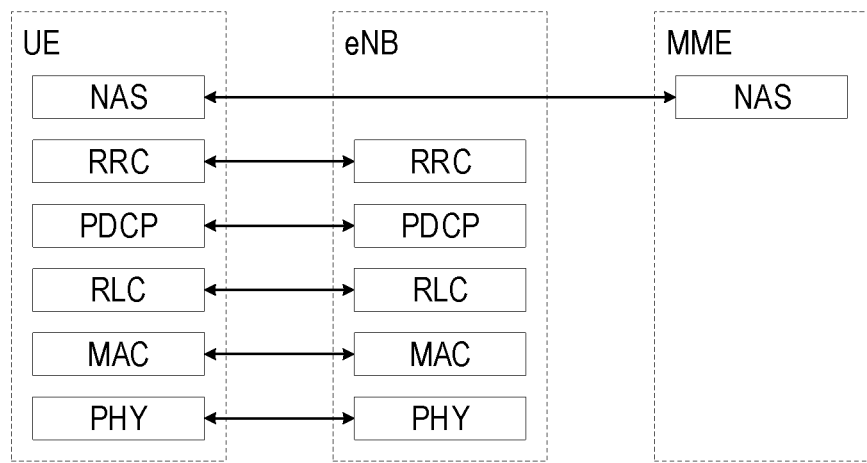
FIG. 2B is a block diagram of exemplary protocol layers of the control-plane portion of the radio (Uu) interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are given by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, a UE in RRC_CONNECTED state monitors PDCCH for DL scheduling assignments (e.g., for PDSCH), UL resource grants (e.g., for PUSCH), and for other purposes. Depending on discontinuous reception (DRX) configuration, in both LTE and NR, a UE may spend a substantial part of its energy on decoding PDCCH without detecting a DL scheduling assignment or UL resource grant directed to it. Accordingly, techniques that can reduce unnecessary PDCCH monitoring, allow a UE to go to sleep more often and/or for longer periods, or allow a UE to wake up less frequently or for shorter periods can be beneficial. This is discussed in more detail below after the following description of NR network architectures and radio interface.

Figure 3:
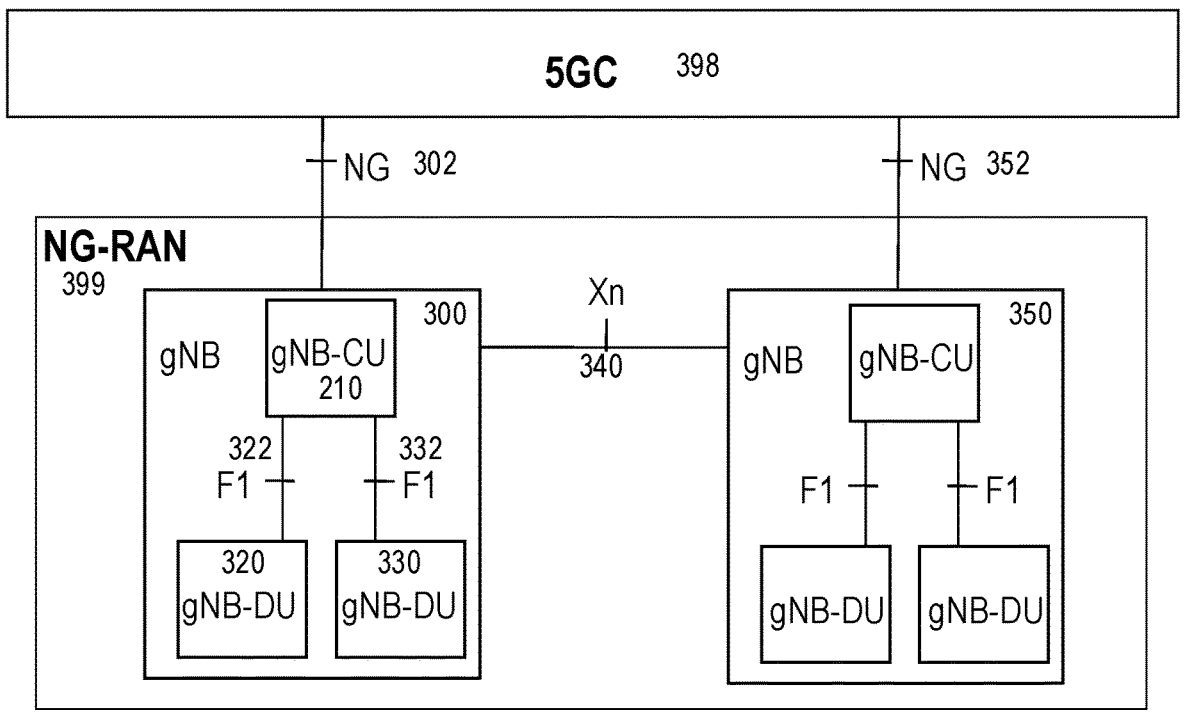
FIGS. 3-4 show two high-level views of an exemplary fifth-generation (5G, also referred to as "New Radio" or NR) network architecture.

FIG. 3 illustrates a high-level view of the 5G network architecture, consisting of a Next Generation RAN (NG-RAN) 399 and a 5G Core (5GC) 398. NG-RAN 399 can include a set of gNodeB's (gNBs) connected to the 5GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP shall be applied.

The NG RAN logical nodes shown in FIG. 3 (and described in 3GPP TS 38.300 and 3GPP TR 38.801) include a central (or centralized) unit (CU or gNB-CU) and one or more distributed (or decentralized) units (DU or gNB-DU). For example, gNB 300 includes gNB-CU 310 and gNB-DUs 320 and 340. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB. In other words, the F1 interface is not visible beyond gNB-CU.

Figure 4:
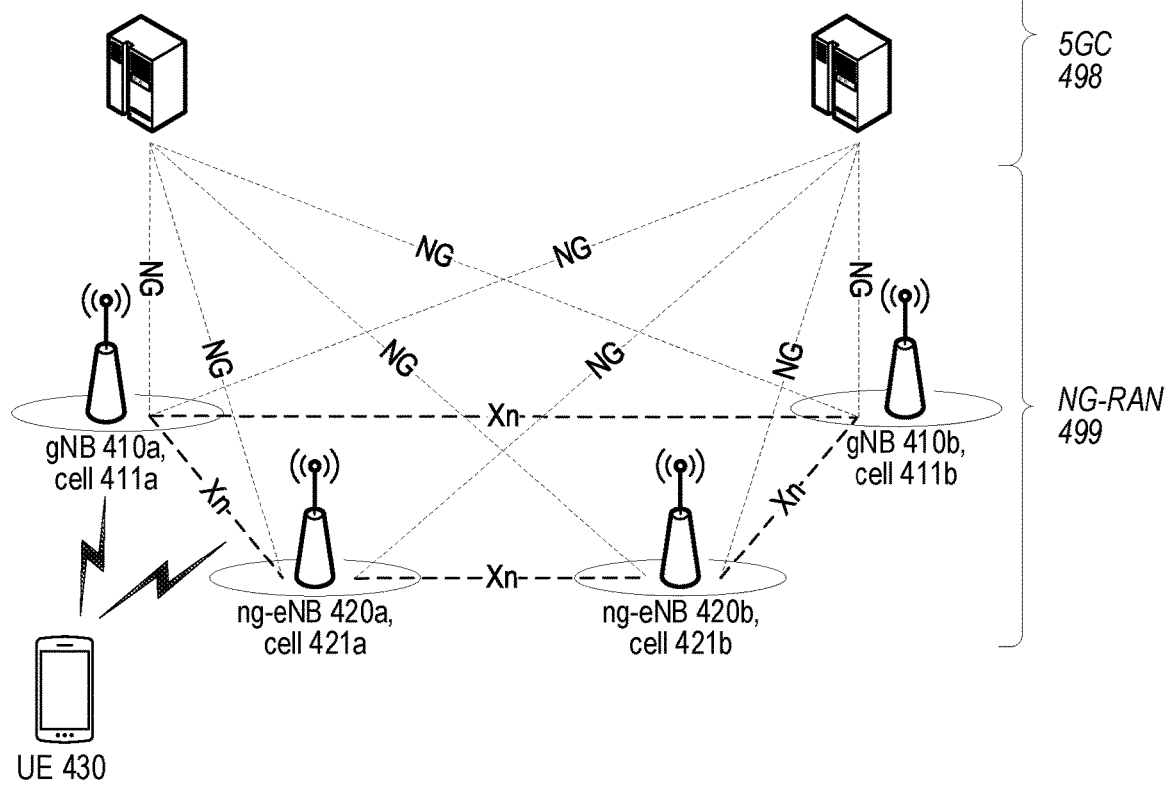

FIG. 4 shows a high-level view of an exemplary 5G network architecture, including a Next Generation Radio Access Network (NG-RAN) 499 and a 5G Core (5GC) 498. As shown in the figure, NG-RAN 499 can include gNBs 410 (e.g., 410a,b) and ng-eNBs 420 (e.g., 420a,b) that are interconnected with each other via respective Xn interfaces. The gNBs and ng-eNBs are also connected via the NG interfaces to 5GC 498, more specifically to the AMF (Access and Mobility Management Function) 430 (e.g., AMFs 430a, b) via respective NG-C interfaces and to the UPF (User Plane Function) 440 (e.g., UPFs 440a,b) via respective NG-U interfaces. Moreover, the AMFs 430a,b can communicate with one or more policy control functions (PCFs, e.g., PCFs 450a,b) and network exposure functions (NEFs, e.g., NEFs 460a,b).

Each of the gNBs 410 can support the NR radio interface including frequency division duplexing (FDD), time division duplexing (TDD), or a combination thereof. In contrast, each of ng-eNBs 420 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 411a-b and 421a-b shown as exemplary in FIG. 4. As mentioned above, the gNBs and ng-eNBs can also use various directional beams to provide coverage in the respective cells. Depending on the particular cell in which it is located, a UE 430 can communicate with the gNB or ng-eNB serving that particular cell via the NR or LTE radio interface, respectively.

Figure 5:
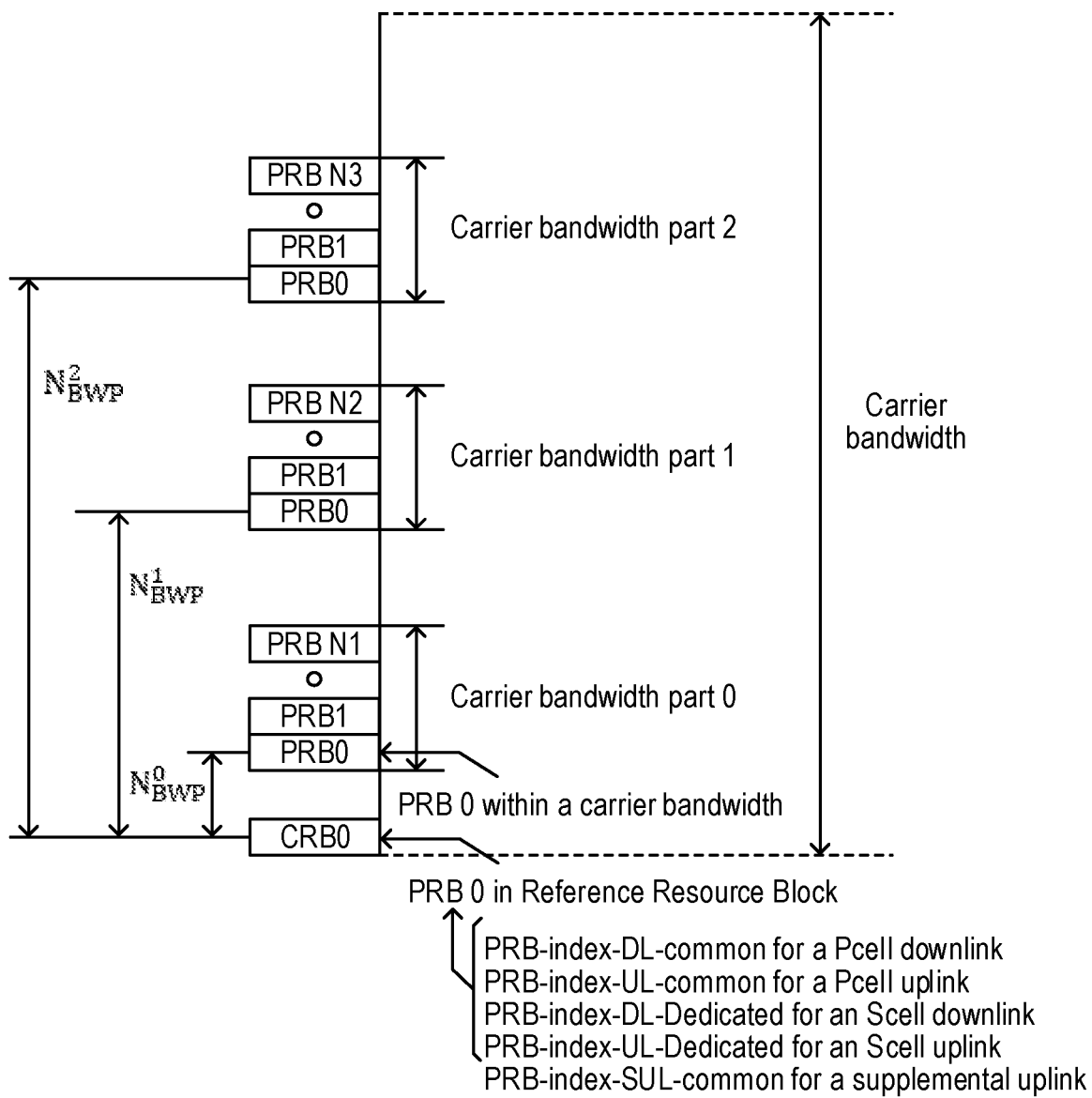
FIG. 5 shows an exemplary frequency-domain configuration for a 5G/NR UE.

FIG. 5 shows an exemplary frequency-domain configuration for an NR UE. In Rel-15 NR, a UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time.

Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWPi}^{size}-1$, where i is the index of the particular BWP for the carrier. Similar to LTE, each NR resource element (RE) corresponds to one OFDM subcarrier during one OFDM symbol interval. NR supports various SCS values $\Delta f=(15 \times 2^{\mu})$ kHz, where $\mu \in (0,1,2,3,4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^{\mu}*50$ MHz. Table 1 below summarizes the supported NR numerologies and associated parameters.

Different DL and UL numerologies can be configured by the network.

TABLE 1

| $\mu$ | $\Delta f = 2^\mu \cdot 15$ (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHz |

Figure 6:
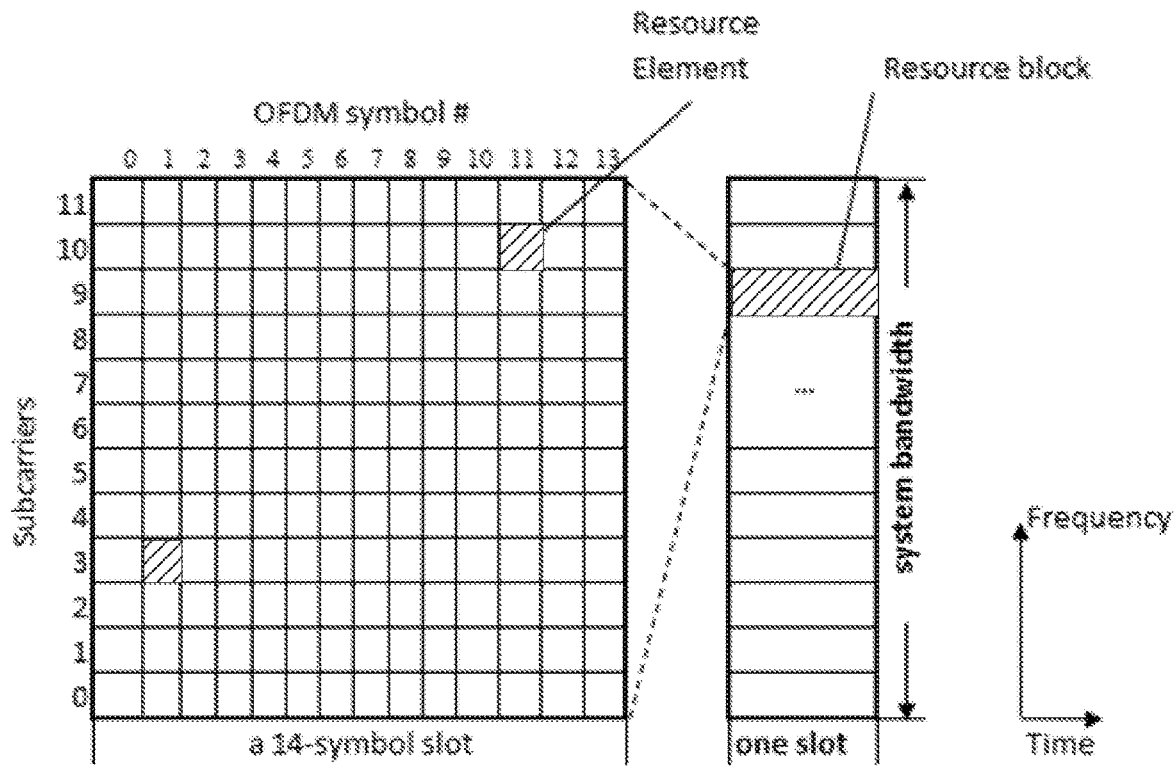
FIG. 6 shows an exemplary time-frequency resource grid for an NR slot.

FIG. 6 shows an exemplary time-frequency resource grid for an NR slot. As illustrated in FIG. 6, a resource block (RB) consists of a group of 12 contiguous OFDM subcarriers for a duration of a 14-symbol slot. Like in LTE, a resource element (RE) consists of one subcarrier in one slot. An NR slot can include 14 OFDM symbols for normal cyclic prefix and 12 symbols for extended cyclic prefix.

Figure 7A:
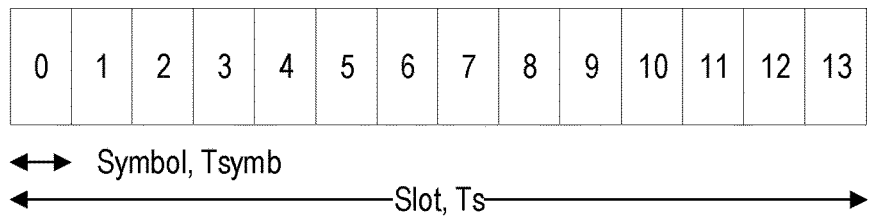
FIGS. 7A-C, shows exemplary NR slot and mini-slot configurations.
Figure 7B:
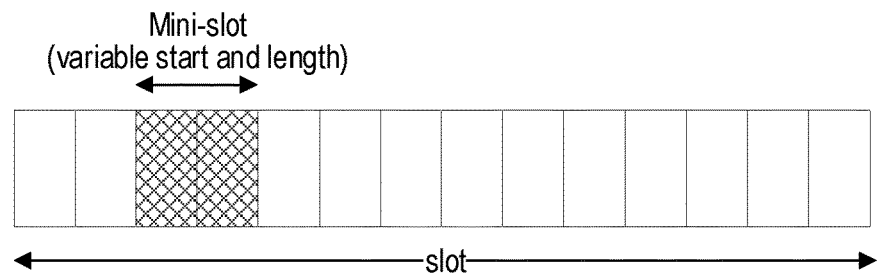

FIG. 7A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. FIG. 7B shows an exemplary mini-slot arrangement in which the mini-slot begins in the third symbol of the slot and is two symbols in duration. Applications of mini-slots include unlicensed spectrum and latency-critical transmission (e.g., URLLC). However, mini-slots are not service-specific and can also be used for eMBB or other services.

Figure 7C:
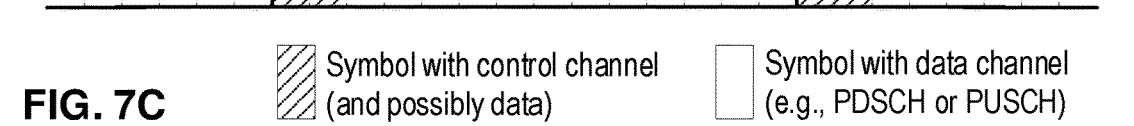

FIG. 7C shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 6C, the first two symbols contain PDCCH and each of the remaining 12 symbols contains physical data channels (PDCH), i.e., either PDSCH or PUSCH. Depending on the particular CORESET configuration (discussed below), however, the first two slots can also carry PDSCH or other information, as required.

A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in LTE subframe. In NR, however, each REG consists of all 12 REs of one OFDM symbol in a RB, whereas an LTE REG includes only four REs. The CORESET time domain size can be configured by an RRC parameter. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

In NR Rel-15, the DCI formats 0_0/1_0 are referred to as "fallback DCI formats," while the DCI formats 0_1/1_1 are referred to as "non-fallback DCI formats." The fallback DCI support resource allocation type 1 in which DCI size depends on the size of active BWP. As such DCI formats 0_1/1_1 are intended for scheduling a single transport block (TB) transmission with limited flexibility. On the other hand, the non-fallback DCI formats can provide flexible TB scheduling with multi-layer transmission.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the five-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (u) and the total number of allocated PRBs before rate matching ($n_{PRB}$), the UE determines the TB Size (TBS) for the PDSCH according to the procedure defined in 3GPP TS 38.214 V15.0.0 clause 5.1.3.2.

Figure 8:
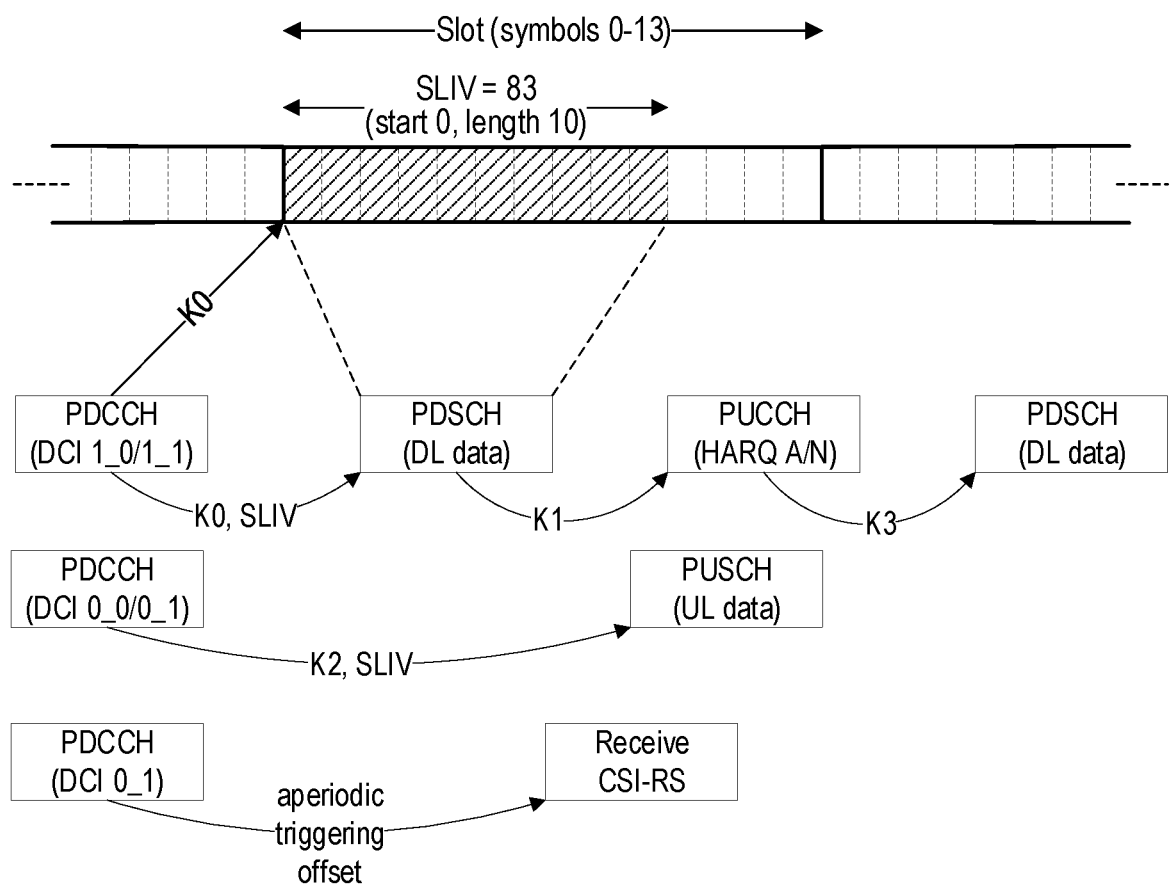
FIG. 8 illustrates various timing offsets between a physical data control channel (PDCCH) and various other signals or channels in a cell of an NR network.

DCI can also include information about various timing offsets (e.g., in slots or subframes) between PDCCH and PDSCH, PUSCH, HARQ, and/or CSI-RS. FIG. 8 illustrates various timing offsets between PDCCH, PDSCH, PUSCH, HARQ, and CSI-RS for NR. For example, offset K0 represents the number of slots between the UE's PDCCH reception of a PDSCH scheduling DCI (e.g., formats 1_0 or 1_1) and the subsequent PDSCH transmission. Likewise, offset K1 represents the number of slots between this PDSCH transmission and the UE's responsive HARQ ACK/NACK transmission on the PUSCH. In addition, offset K3 represents the number of slots between this responsive ACK/NACK and the corresponding retransmission of data on PDSCH. In addition, offset K2 represents the number of slots between the UE's PDCCH reception of a PUSCH grant DCI (e.g., formats 0_0 or 0_1) and the subsequent PUSCH transmission. Each of these offsets can take on values of zero and positive integers.

Finally, DCI format 0_1 can also include a network request for a UE report of channel state information (CSI) or channel quality information (CQI). Prior to sending this report, the UE receives and measures CSI-RS transmitted by the network. The parameter aperiodicTriggeringOffset represents the integer number of slots between the UE's reception of a DCI including a CSI request and the network's transmission of the CSI-RS. This parameter can take on values 0-4.

Offset K0 is part of a UE's PDSCH time-domain resource allocation (TDRA) provided by the network node. Also included in the PDSCH TDRA is a slot length indicator values (SLIV), which identifies a particular combination of a starting symbol (S) and a length (L) of the time-domain allocation for PDSCH. In general, S can be any symbol 0-13 and L can be any number of symbols beginning with S until the end of the slot (i.e., symbol 13). The SLIV can be used as a look-up table index to find the associated (S, L) combination. FIG. 8 shows an exemplary PDSCH TDRA having an arbitrary K0 slot offset and SLIV=83, which corresponds to starting symbol 0 and length of 10 symbols in the slot indicated by K0. Similarly, offset K2 is part of a UE's PUSCH TDRA provided by the network node, which also includes a corresponding SLIV.

For NR, the scheduling offsets shown in FIG. 8 can be larger than zero, which facilitates both same-slot (zero offset) and cross-slot (non-zero offset) scheduling. For example, cross-slot scheduling may be desirable for facilitating UE power savings by adaptively changing between upper and lower BWPs for PDCCH and PDSCH, respectively.

Figure 9A:
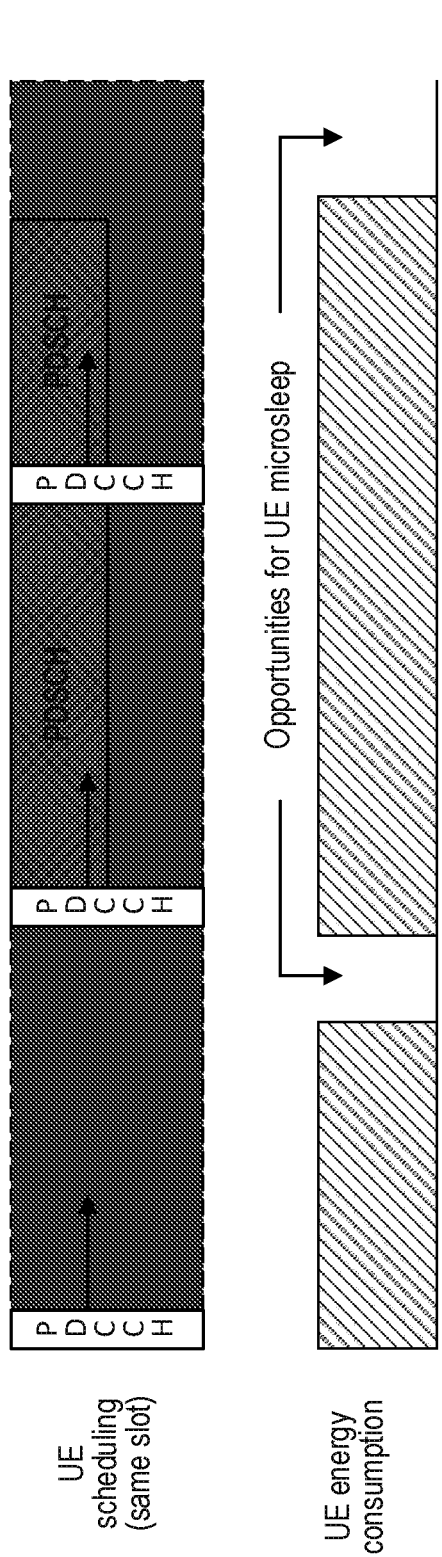
FIGS. 9A and 9B show timing diagrams for same- and cross-slot PDCCH scheduling, respectively, and corresponding UE energy consumption.
Figure 9B:
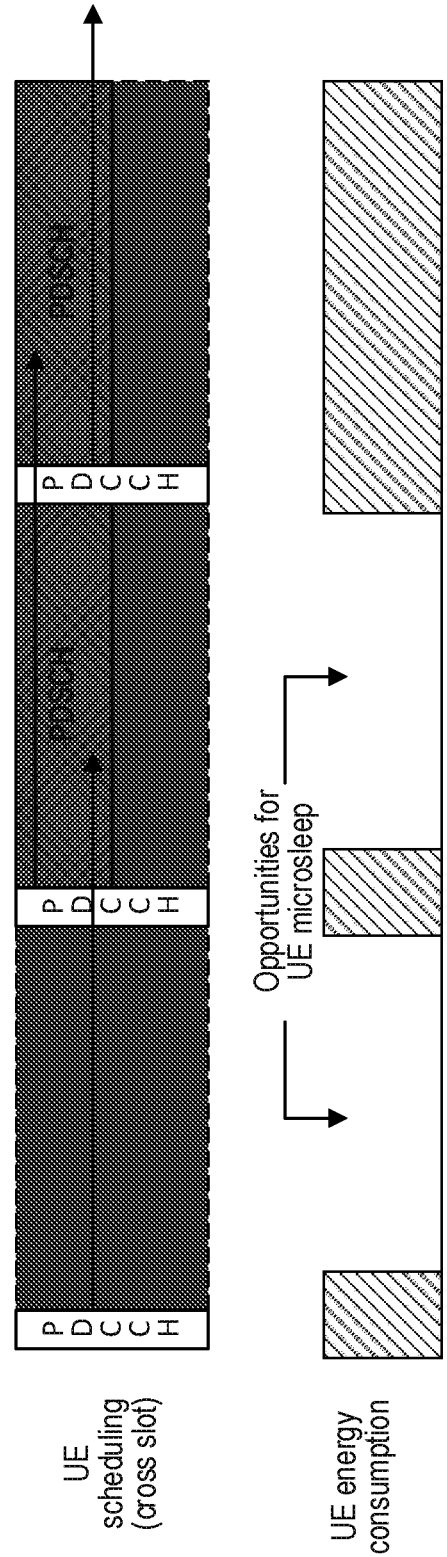

FIGS. 9A and 9B show timing diagrams for same- and cross-slot PDCCH scheduling, respectively, and corresponding UE energy consumption. In FIG. 9A, when same-slot scheduling is used (i.e., K0=0), the UE has a small window of opportunity for low-energy "microsleep" during the leftmost slot after PDCCH. However, the UE must remain on in the other two slots to receive PDSCH scheduled by same-slot PDCCH. In FIG. 9B, when cross-slot PDSCH scheduling is used (specifically K0=1 for next slot after PDCCH), the UE has two longer opportunities for "microsleep" after receiving PDCCH during the first two slots.

3GPP TS 38.331 (v15.4.0) defines an information element (IE) called PDSCH-TimeDomainResourceAllocationList that is used to configure a time domain relation between PDCCH and PDSCH, including the K0 parameter discussed above. This IE can be included as part of the larger IEs PDSCH-ConfigCommon (cell-specific) or PDSCH-Config (UE-specific). FIG. 10A shows an exemplary ASN.1 data structure for a PDSCH-TimeDomainResourceAllocation-List IE.

3GPP TS 38.331 (v15.4.0) also defines a PUSCH-TimeDomainResourceAllocationList IE that is used to configure a time domain relation between PDCCH and PUSCH, including the K2 parameter discussed above. This IE can be included as part of the larger IEs PUSCH-ConfigCommon (cell-specific) or PUSCH-Config (UE-specific). FIG. 10B shows an exemplary ASN.1 data structure for the PUSCH-TimeDomainResourceAllocationList IE.

A simple way of configuring cross-slot scheduling semi-statically is to explicitly configure and remove K0=0 from the possible values in PDSCH-TimeDomainResourceAllocationList. Similarly, K2=0 can be removed from the possible values in PUSCH-TimeDomainResourceAllocationList. However, explicit configuration of K2 is only necessary if the network does not intend to use default values defined in 3GPP TS 38.214 (v15.4.0) Tables 6.1.2.1.1-1 to 6.1.2.1.1-3, where the minimum default value of K2 is 1. If default values are used, the network can leave the PUSCH-TimeDomainResourceAllocationList empty in PUSCH-Config or PUSCH-ConfigCommon. In either case, the UE knows that same-slot PDSCH and PUSCH scheduling will not be used, such that the UE can enter microsleep for power savings as illustrated in FIG. 9.

On the other hand, semi-static configuration of cross-slot scheduling leads to throughput loss, latency, and additional power consumption when the UE needs to be scheduled for a DL or UL data burst. In such cases, it is important that the UE can be immediately scheduled in the same-slot mode to avoid these unnecessary delays, throughput loss, and power consumption. Currently, however, the configuration of K0 and K2 is done through radio resource control (RRC) signaling at higher layers, which is relatively slow and cannot dynamically adapt to the change in bursty traffic.

Exemplary embodiments of the present disclosure address these and other problems, issues, and/or drawbacks by providing techniques and/or mechanisms for dynamically configuring and/or switching between same-slot and cross-slot scheduling of PDSCH and/or PUSCH for a particular UE. For example, the network can configure the UE with different time-domain resource assignment (TDRA) configurations that can be enabled or disabled dynamically, e.g., by DCI or MAC control element (CE) signaling. Such techniques facilitate faster switching between same- and cross-slot scheduling, thereby facilitating reductions in overall UE power consumption and reductions and/or avoidance of excess latency and loss of data throughput.

In some embodiments, dynamic change between same- and cross-slot scheduling can be facilitated by defining a PDSCH-TimeDomainResourceAllocationListCross specific for cross-slot only scheduling (e.g., k0≥1), in addition to the PDSCH-TimeDomainResourceAllocationList currently defined for both same- and cross-slot scheduling (e.g., k0≥0). Layer-1 or MAC CE signaling can then be used to enable/disable any of these configurations. FIG. 11 shows an exemplary ASN.1 data structure for a PDSCH-TimeDomainResourceAllocationListCross IE according to these embodiments.

Such exemplary PDSCH-TimeDomainResourceAllocationListCross IEs can be signaled together with the PDSCH-TimeDomainResourceAllocationList. FIG. 12 shows an exemplary ASN.1 data structure for a PDSCH-ConfigCommon IE that includes both of these lists. DCI and/or MAC CE signaling can be used to select one of these two lists and a TDRA from the selected list.

In other embodiments, a PDSCH-TimeDomainResourceAllocationList IE can be redefined such that each PDSCH-TimeDomainResourceAllocation IE is associated with a corresponding PDSCH-TimeDomainResourceAllocationCross IE. DCI and/or MAC CE signaling can be used to select one of the allocations defined in PDSCH-TimeDomainResource-AllocationList, as well as between same- and cross-slot configurations for the selected allocation. By defining PDSCH-TimeDomainResourceAllocationList IE in this manner, no changes are necessary for higher-level IEs such as PDSCH-ConfigCommon. FIG. 13 shows an exemplary ASN.1 data structure for a TimeDomainResourceAllocationList IE according to these embodiments.

In other embodiments, the PDSCH-TimeDomainResourceAllocation IE can be redefined to include an additional parameter k0_cross. In such case, the PDSCH-TimeDomainResourceAllocationList IE can be used to signal the list of individual allocations having both k0 and k0_cross. DCI and/or MAC CE signaling can be used to select one of the allocations defined in PDSCH-TimeDomainResourceAllocationList, as well as between k0 and k0_cross for the selected allocation. FIG. 14 shows an exemplary ASN.1 data structure for a TimeDomainResourceAllocationList IE according to these embodiments. Table 2 below provides some exemplary descriptions for the fields shown in FIG. 14.

TABLE 2

| Field name | Description |
| --- | --- |
| k0 | Slot offset between DCI and its scheduled PDSCH (see 3GPP TS 38.214, clause 5.1.2.1). When the field is absent the UE applies the value 0. |
| k0_cross | Slot offset between DCI and its scheduled PDSCH (see 3GPP TS 38.214, clause 5.1.2.1). Value 0 is 'reserved' or unused. |
| mappingType | PDSCH mapping type. (see 3GPP TS 38.214, clause 5.3) |
| startSymbolAndLength | An index giving valid combinations of start symbol and length (jointly encoded) as start and length indicator (SLIV). The network configures the field so that the allocation does not cross the slot boundary (see 3GPP TS 38.214, clause 5.1.2.1) |

Although the above examples are based on PDSCH scheduling, skilled persons will readily comprehend that the above examples can be readily adapted to PUSCH scheduling based on K2 slot offset. Furthermore, such examples can also be adapted to scheduling aperiodic CSI reporting, as illustrated in FIG. 8.

The DCI and/or MAC CE signaling mentioned above can be realized according to various embodiments. In some embodiments, the DCI time-domain resource allocation (TDRA) field can include an additional bit to enable either same- or cross-slot scheduling from a future reference slot onwards, e.g., the next slot. For example, a reserved bit in DCI format 1-0 can be used for this purpose. As such, the UE can start monitoring PDCCH assuming cross-slot scheduling mode, and then the network can indicate to the UE with the additional bit in the scheduling DCI to enable the same-slot PDSCH-TimeDomainResourceAllocation from the future slot onwards. Subsequently, the network can indicate to the UE with the additional bit in the scheduling DCI to enable the cross-slot PDSCH-TimeDomainResourceAllocation from another future slot onwards. In this manner, the DCI bit can be used to dynamically switch between same- and cross-slot scheduling. MAC CE signaling can be used in a similar manner, although it may require an additional delay in mode switching as compared to DCI signaling.

In a related embodiment, a specific power saving signal DCI (based on existing DCI formats or a new one) can be sent to indicate the change from cross- to same-slot scheduling TDRA configuration and vice versa. This DCI can address specific UEs, using e.g., C-RNTI, or a group of UEs using a group RNTI, or a global DCI monitored by all UEs.

In some embodiments, a specific RNTI can be used to indicate a change in the scheduling mode configuration. For example, if the UE receives a C-RNTI (or CS-RNTI) based DCI, it changes to same-slot scheduling mode. Alternately or in addition, if the UE receives a paging message, it changes to same-slot scheduling mode to read SI update.

In some embodiments, the type of scheduling DCI can also be used as indication of scheduling mode. For example, DL scheduling DCI (e.g., formats 1-0 and 1-1) can indicate the switch to regular scheduling, while UL scheduling DCI (e.g., formats 0-1 and 0-0) can indicate the UE to switch to cross-slot scheduling.

In some embodiments, types of L1 signaling other than DCI can be used for indication of a change in scheduling mode. For example, the UE can be configured to monitor two PDCCH search spaces, referred to as SS1 and SS2. If the UE receives a PDCCH in SS1, then it changes to (or maintains) same-slot scheduling configuration. On the other hand, if the UE receives a PDCCH in SS2, then it changes to (or maintains) cross-slot scheduling configuration. As another example, the UE can distinguish between same- and cross-slot scheduling based on the BWP or CORESET in which it is configured and/or active.

In other embodiments, the UE can be configured with a set of k0 (or k2) offset values that can include zero (e.g., as in Rel-15) as well as non-zero values, but then DCI signaling can be used to activate or deactivate specific ones of the configured offset values. For example, this can be done by an additional DCI bit, field, variable, value, etc. used to dynamically switch between same- and cross-slot scheduling, such as described above in relation other embodiments.

Although the above examples are focused on DCI signaling, skilled persons will readily comprehend that the above examples can be readily adapted to MAC CE-based signaling.

In other embodiments, the network can configure the UE with a timer to move between cross-slot and regular scheduling modes. For example, the UE can be configured (e.g., via RRC signaling) to expect cross-slot scheduling before the first scheduling DCI (particularly DL scheduling), and then move to same-slot scheduling and initiate a timer or slot counter. After expiration of the timer or after a specific number of slots without receiving a scheduling DCI, the UE can return to cross-slot scheduling mode.

In addition to cross-slot scheduling, the UE can also be configured to expect PDSCH after a few symbols but within the same slot. In the exemplary field descriptions given above, start and length indicator (SLIV) is an index giving valid combinations of starting symbol (within a slot) and length of symbols for scheduling within the slot, the two being jointly encoded. As such, any of the embodiments discussed above can also be applied to dynamic change between same-slot scheduling with zero SLIV (e.g., starting in next symbol) and non-zero SLIV (e.g., starting with delay of one or more symbols in the slot).

As shown in Table 3 below, the size of the TDRA field in existing DCI formats can vary based on the number of TDRA fields included. All subclause references are to 3GPP TS 38.214.

TABLE 3

| DCI Format | TDRA field | UE-specific RNTI |
|---|---|---|
| 0_0 | Time domain resource assignment-4 bits as defined in Subclause 6.1.2.1 | C-RNTI or CS-RNTI or MCS-C-RNTI |
| 0_1 | Time domain resource assignment-0, 1, 2, 3, or 4 bits as defined in Subclause 6.1.2.1. The bitwidth for this field is determined as $\lceil \log_2 (I) \rceil$ bits, where I is the number of entries in the higher layer parameter pusch-TimeDomainAllocationList if the higher layer parameter is configured; otherwise I is the number of entries in the default table. | C-RNTI or CS-RNTI or SP-CSI-RNTI or MCS-C-RNTI |
| 1_0 | Time domain resource assignment-4 bits as defined in Subclause 5.1.2.1 | C-RNTI or CS-RNTI or MCS-C-RNTI |
| 1_1 | Time domain resource assignment-0, 1, 2, 3, or 4 bits as defined in Subclause 5.1.2.1. The bitwidth for this field is determined as $\lceil \log_2 (I) \rceil$ bits, where I is the number of entries in the higher layer parameter pdsch-TimeDomainAllocationList if the higher layer parameter is configured; otherwise I is the number of entries in the default table. | C-RNTI or CS-RNTI or MCS-C-RNTI |

Although information for selection of same- or cross-slot scheduling can be signaled together with TDRA in DCI, it may be desirable that a mode change between same- and cross-slot scheduling should not require change in DCI size. Two exemplary embodiments for maintaining the same DCI size when configuring a UE to operate in same- and cross-slot scheduling modes with fast switching are discussed below.

In some embodiments, if an additional cross-slot parameter k0_cross is introduced in PDSCH-TimeDomainResourceAllocation as discussed above, then the network can use a single value of the TDRA field to refer to values for both k0 and k0_cross. Put a different way, the TDRA value is "shared" by k0 and k0_cross. This is illustrated by exemplary Table 4 below.

TABLE 4

| TDRA | k0 | k0_cross | SLIV |
|---|---|---|---|
| 0 | 0 | 1 | 0 |
| 1 | 0 | 1 | 1 |
| 2 | 0 | 1 | 12 |
| 3 | 0 | 1 | 16 |
| ... | ... | ... | ... |
| 15 | 0 | 1 | 128 |

In other embodiments, if a second PDSCH-TimeDomainResourceAllocationListCross is defined and used for cross-slot scheduling as discussed above, it can be configured with SLIV and slot offset values independently from the configuration of same-slot scheduling defined in PDSCH-TimeDomainResourceAllocationList. For example, the number TDRA entries for cross- and same-slot scheduling can be different. To keep the same DCI size for both same- and cross-slot scheduling, the number of TDRA bits can be based on the maximum of the number of entries in the TDRA list for regular scheduling and the number of entries in the TDRA list for cross-slot scheduling. Table 5 below illustrates an exemplary configuration in which the same TDRA values are applied differently to same- and cross-slot scheduling.

TABLE 5

| Regular scheduling | | | Cross-slot scheduling | | |
|---|---|---|---|---|---|
| TDRA | k0 | SLIV | TDRA | k0_cross | SLIV |
| 0 | 0 | 0 | 0 | 1 | 0 |
| 1 | 0 | 1 | 1 | 1 | 13 |
| 2 | 0 | 12 | 2 | 1 | 18 |
| 3 | 0 | 16 | 3 | 1 | 16 |
| ... | ... | ... | ... | ... | ... |
| 15 | 0 | 128 | | | |

In other embodiments, a single TDRA table can be configured for the UE, and L1 signaling is used to enable or disable table entries as needed for respective same- and cross-slot scheduling modes.

The embodiments described above can be further illustrated with reference to FIGS. 15-16, which show exemplary methods (e.g., procedures) performed by a network node and a UE, respectively. Put differently, various features of the operations described below correspond to various embodiments described above.

Figure 15:
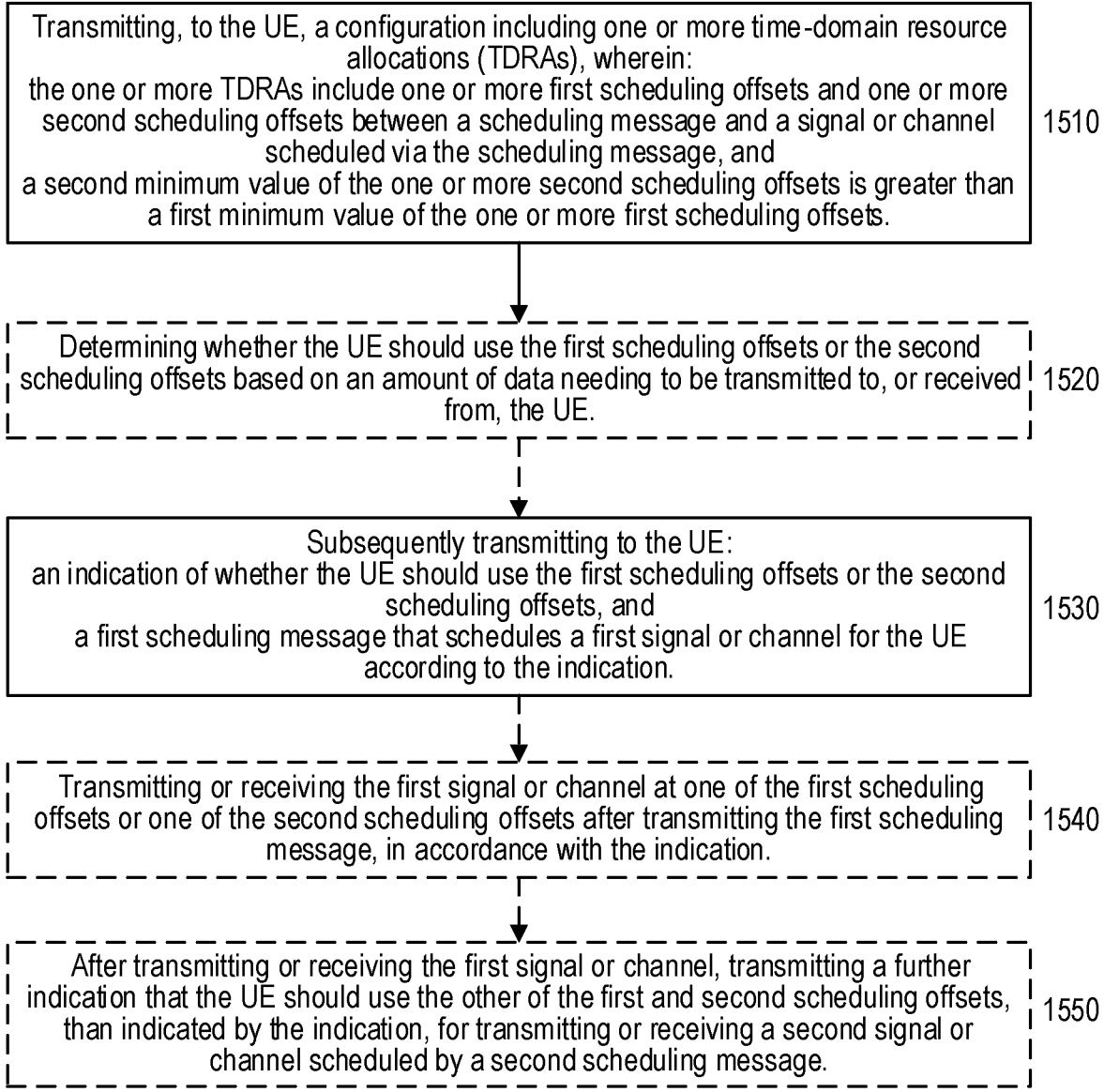
FIG. 15 shows a flow diagram of an exemplary method (e.g., procedure) performed by a network node in a wireless network, according to various exemplary embodiments of the present disclosure.

In particular, FIG. 15 shows a flow diagram of an exemplary method (e.g., procedure) for scheduling user equipment (UEs) served by a network node, according to various exemplary embodiments of the present disclosure. The exemplary method can be performed by a network node (e.g., base station, eNB, gNB, etc., or component thereof) serving one or more UEs in a cell of a wireless network (e.g., E-UTRAN, NG-RAN), such as described herein with reference to other figures. Furthermore, the exemplary method shown in FIG. 15 can be used cooperatively with other exemplary methods described herein (e.g., FIG. 16) to provide various exemplary benefits and/or advantages described herein, such as managing and/or reducing energy consumption of the UEs. Although FIG. 15 shows specific blocks in a particular order, the operations of the exemplary method can be performed in a different order than shown and can be combined and/or divided into blocks having different functionality than shown. Optional blocks or operations are indicated by dashed lines.

The exemplary method can include the operations of block 1510, where the network node can transmit, to the UE, a configuration including one or more time-domain resource allocations (TDRAs). The one or more TDRAs can include one or more first scheduling offsets and one or more second scheduling offsets between a scheduling message and a signal or channel scheduled via the scheduling message. A second minimum value of the second scheduling offsets is greater than a first minimum value of the first scheduling offsets.

The exemplary method can include the operations of block 1530, where the network node can subsequently transmit, to the UE, an indication of whether the UE should use the one or more first scheduling offsets or the one or more second scheduling offsets, and a first scheduling message that schedules a first signal or channel for the UE according to the indication. In some embodiments, the exemplary method can also include the operations of block 1550, where the network node can transmit or receive the first signal or channel at one of the first scheduling offsets or one of the second scheduling offsets after transmitting the first scheduling message, in accordance with the indication.

In FIG. 15 and its description, the "first scheduling message" is used to denote a particular scheduling message (e.g., transmitted in block 1530), while "a scheduling message" is used more generally to refer to any scheduling message to which the first scheduling offsets and/or the second scheduling offsets are applicable. The first scheduling message is a particular example of "a scheduling message." Furthermore, in the following description, "first scheduling offsets" refer to the "one or more first scheduling offsets," and "second scheduling offsets" refer to the "one or more second scheduling offsets." The same convention is used in relation to "TDRAs".

In some embodiments, the configuration can be transmitted (e.g., in block 1510) in a radio resource control (RRC) message and the first scheduling message can be transmitted (e.g., in block 1530) as downlink control information (DCI) in a physical downlink control channel (PDCCH).

In such embodiments, the indication can be transmitted according to any of the following:
  in a separate bit field in the DCI;
  as part of a TDRA field in the DCI;
  as indicated by a DCI format used for the DCI;
  as indicated by a type of identifier included in the DCI or the PDCCH carrying the first scheduling message;
  as indicated by a PDCCH search space in which the first scheduling message is transmitted;
  as indicated by a bandwidth part (BWP) in which the first scheduling message is transmitted;
  in a further DCI that does not include a scheduling message for the UE;

in a medium access control (MAC) control element (CE); or in a further RRC message.

In some of these embodiments, the identifier (e.g., included in the DCI or PDCCH) can be a radio network temporary identifier (RNTI) used to scramble a cyclic redundancy check (CRC) of the DCI. In such case, a paging RNTI (P-RNTI) can indicate that the UE should use the second scheduling offsets, and a non-paging RNTI can indicate that the UE should use the first scheduling offsets.

In some embodiments, the configuration (e.g., transmitted in block 1510) can include a first list of a plurality of first TDRAs including a respective plurality of scheduling offsets from the first scheduling offsets; and a second list of a plurality of second TDRAs including a respective plurality of scheduling offsets from the second scheduling offsets. An example is illustrated by FIG. 12. In such embodiments, the indication (e.g., transmitted in block 1530) can indicate whether the first list or the second list should be used, and the first scheduling message (e.g., transmitted in block 1530) can indicate a particular TDRA within the indicated list.

In other embodiments, the configuration can include a third list of a plurality of TDRA fields, and the TDRA fields in the third list can include respective first TDRAs including respective scheduling offsets from the first scheduling offsets, and respective second TDRAs including respective scheduling offsets from the second scheduling offsets. An example is illustrated by FIG. 13. In such embodiments, the indication (e.g., transmitted in block 1530) can indicate, for all TDRA fields in the third list, whether the first TDRAs or the second TDRAs should be used, and the first scheduling message (e.g., transmitted in block 1530) can indicate a particular TDRA field in the third list.

In other embodiments, the configuration can include a fourth list of a plurality of TDRAs, and the TDRAs in the fourth list can include respective scheduling offsets from the first scheduling offsets and respective scheduling offsets from the second scheduling offsets. An example is illustrated by FIG. 14. In such embodiments, the indication (e.g., transmitted in block 1530) can indicate, for all TDRAs in the fourth list, whether the first scheduling offsets or the second scheduling offsets should be used, and the first scheduling message (e.g., transmitted in block 1530) can indicate a particular TDRA in the fourth list.

In some embodiments, each first scheduling offset can comprise one or more symbols in a same slot as a scheduling message, and each second scheduling offset can comprise two or more symbols in a same slot as a scheduling message.

In other embodiments, the first scheduling offsets and the second scheduling offsets can be in units of slots, with the second minimum value (i.e., of the second scheduling offsets) being greater than a threshold and the first minimum value (i.e., of the first scheduling offsets) being less than or equal to the threshold. In various embodiments, the threshold can be zero or a parameter value included in the transmitted configuration.

In some of these embodiments, the first scheduling message can include a TDRA index value that corresponds to a particular first scheduling offset and to a particular second scheduling offset. Examples of such arrangements are shown in Tables 4-5 above. In such embodiments, the TDRA index value can also correspond to a start and length indicator value, SLIV, associated with the particular first scheduling offset and with the particular second scheduling offset (e.g., as illustrated in Table 4). Alternatively, the TDRA index value can correspond to a first SLIV associated with the particular first scheduling offset, and to a second SLIV associated with the particular second scheduling offset (e.g., as illustrated in Table 5).

In some embodiments, the second scheduling offsets can be a subset of the first scheduling offsets. As an example, the network can configure the UE with a set of K0 (or K2) offset values that can include zero values and non-zero values. In which case, the entire set can represent the first scheduling offsets (with minimum value zero) and the non-zero subset (with minimum value>0) can represent the second scheduling offsets. In such embodiments, the indication (e.g., transmitted in block 1530) can activate or deactivate the portion of the first scheduling offsets other than the second scheduling offsets (e.g., the zero-valued scheduling offsets).

In various embodiments, the one or more first scheduling offsets and the one or more second scheduling offsets, included in the configuration, can be one of the following:

respective K0 offsets between a scheduling message and a physical downlink shared channel (PDSCH) transmission scheduled by the scheduling message;

respective K2 offsets between a scheduling message and a physical uplink shared channel (PUSCH) transmission scheduled by the scheduling message; and respective aperiodic triggering offsets between a scheduling message and a channel state information reference signal (CSI-RS) transmission scheduled by the scheduling message.

In some embodiments, the indication can indicate that the UE should use the second scheduling offsets, and the configuration can also identify a period following the indication during which the UE should use the second scheduling offsets and after which the UE should use the first scheduling offsets if a further scheduling message has not been received by the UE.

In some embodiments, the exemplary method can also include the operations of block 1520, where the network node can determine whether the UE should use the first scheduling offsets or the second scheduling offsets based on an amount of data needing to be transmitted to, or received from, the UE. In such embodiments, the indication (e.g., transmitted in block 1530) can be based on this determination.

In some embodiments, the exemplary method can also include the operations of block 1550, where the network node can, after transmitting or receiving the first signal or channel, transmit a further indication that the UE should use the other of the first and second scheduling offsets, than indicated by the indication, for transmitting or receiving a second signal or channel scheduled by a second scheduling message. For example, if the indication indicated that the UE should use the first scheduling offsets, the further indication can indicate that the UE should use the second scheduling offsets.

Figure 16:
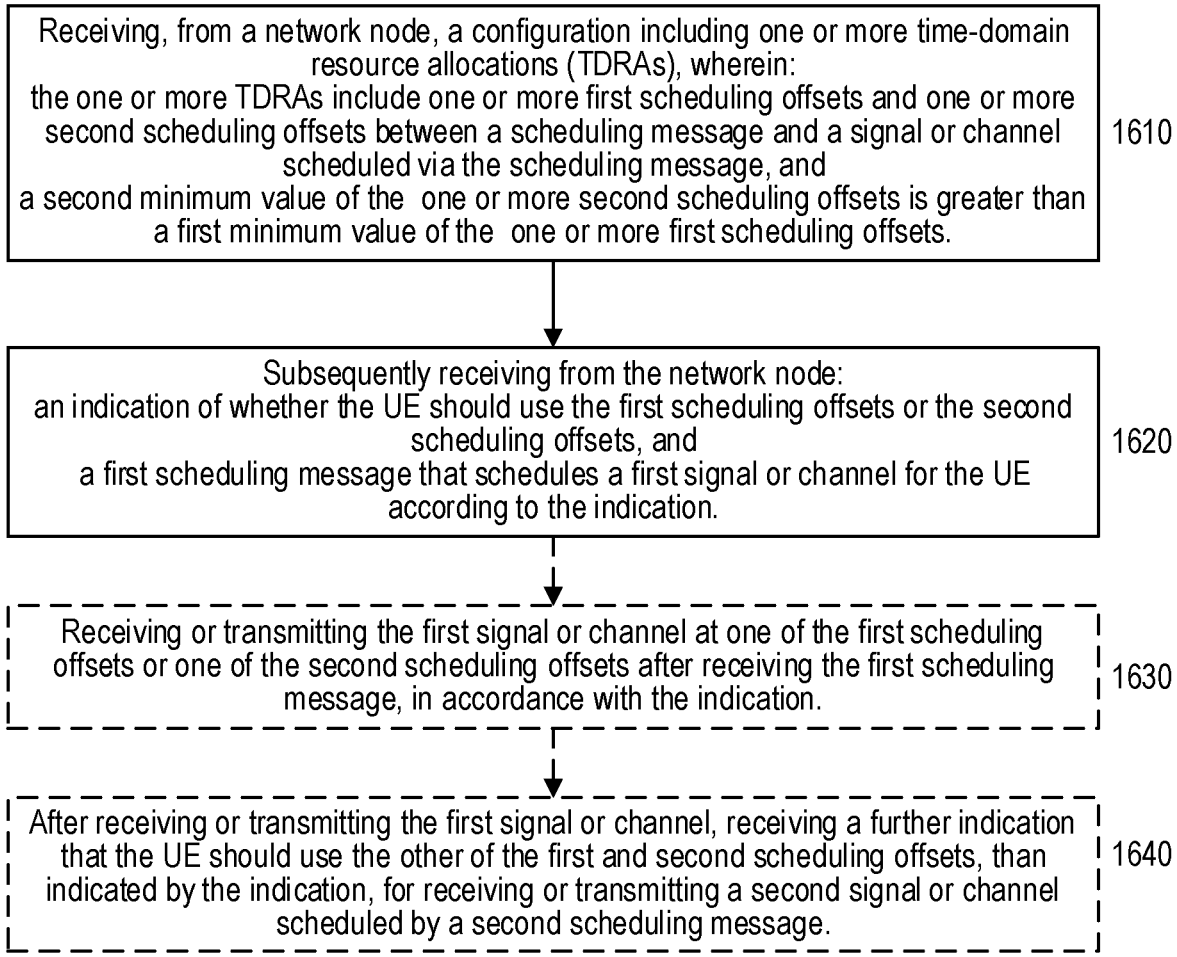
FIG. 16 shows a flow diagram of an exemplary method (e.g., procedure) performed by a user equipment (UE), according to various exemplary embodiments of the present disclosure.

In addition, FIG. 16 shows a flow diagram of an exemplary method (e.g., procedure) performed by a user equipment (UE) configured for operation in a wireless network, according to various exemplary embodiments of the present disclosure. The exemplary method can be performed by a user equipment (e.g., UE, wireless device, IoT device, modem, etc. or component thereof) served by a network node (e.g., base station, eNB, gNB, etc., or component thereof) in the wireless network (e.g., E-UTRAN, NG-RAN), such as described herein with reference to other figures. Furthermore, the exemplary method shown in FIG. 16 can be used cooperatively with other exemplary methods described herein (e.g., FIG. 15) to provide various benefits and/or advantages described herein, such as managing and/or reducing energy consumption of the UE. Although FIG.

16 shows specific blocks in a particular order, the operations of the blocks can be performed in a different order than shown and can be combined and/or divided into blocks having different functionality than shown. Optional blocks or operations are indicated by dashed lines.

The exemplary method can include the operations of block 1610, where the UE can receive, from the network node serving the UE in the wireless network, a configuration including one or more time-domain resource allocations (TDRAs). The one or more TDRAs can include one or more first scheduling offsets and one or more second scheduling offsets between a scheduling message and a signal or channel scheduled via the scheduling message. A second minimum value of the one or more second scheduling offsets is greater than a first minimum value of the one or more first scheduling offsets.

The exemplary method can include the operations of block 1620, where the UE can subsequently receive, from the network node, an indication of whether the UE should use the one or more first scheduling offsets or the one or more second scheduling offsets, and a first scheduling message that schedules a first signal or channel for the UE according to the indication. In some embodiments, the exemplary method can also include the operations of block 1640, where the UE can receive or transmit the first signal or channel at one of the first scheduling offsets or one of the second scheduling offsets after receiving the first scheduling message, in accordance with the indication.

In FIG. 16 and its description, the "first scheduling message" is used to denote a particular scheduling message (e.g., received in block 1620), while "a scheduling message" is used more generally to refer to any scheduling message to which the first scheduling offsets and/or the second scheduling offsets are applicable. The first scheduling message is a particular example of "a scheduling message." Furthermore, in the following description, "first scheduling offsets" refer to the "one or more first scheduling offsets," and "second scheduling offsets" refer to the "one or more second scheduling offsets." The same convention is used in relation to TDRAs. In some embodiments, the configuration can be received (e.g., in block 1610) in a radio resource control (RRC) message and the first scheduling message can be received (e.g., in block 1620) as downlink control information (DCI) in a physical downlink control channel (PDCCH). In such embodiments, the indication can be transmitted according to any of the following:
  in a separate bit field in the DCI;
  as part of a TDRA field in the DCI;
  as indicated by a DCI format used for the DCI;
  as indicated by a type of identifier included in the DCI or the PDCCH carrying the first scheduling message;
  as indicated by a PDCCH search space in which the first scheduling message is received;
  as indicated by a bandwidth part (BWP) in which the first scheduling message is received;
  in a further DCI that does not include a scheduling message for the UE;
  in a medium access control (MAC) control element (CE); or
  in a further RRC message.

In some of these embodiments, the identifier (e.g., included in the DCI or PDCCH) can be a radio network temporary identifier (RNTI) used to scramble a cyclic redundancy check (CRC) of the DCI. In such case, a paging RNTI (P-RNTI) can indicate that the UE should use the second scheduling offsets, and a non-paging RNTI can indicate that the UE should use the first scheduling offsets.

In some embodiments, the configuration (e.g., received in block 1610) can include a first list of a plurality of first TDRAs including a respective plurality of scheduling offsets from the first scheduling offsets; and a second list of a plurality of second TDRAs including a respective plurality of scheduling offsets from the second scheduling offsets. An example is illustrated by FIG. 12. In such embodiments, the indication (e.g., received in block 1620) can indicate whether the first list or the second list should be used, and the first scheduling message (e.g., received in block 1620) can indicate a particular TDRA within the indicated list.

In other embodiments, the configuration can include a third list of a plurality of TDRA fields. The TDRA fields in the third list can include respective first TDRAs including respective scheduling offsets from the first scheduling offsets, and respective second TDRAs including respective scheduling offsets from the second scheduling offsets. An example is illustrated by FIG. 13. In such embodiments, the indication (e.g., received in block 1620) can indicates, for all TDRA fields in the third list, whether the first TDRAs or the second TDRAs should be used, and the first scheduling message (e.g., received in block 1620) can indicate a particular TDRA field in the third list.

In other embodiments, the configuration can include a fourth list of a plurality of TDRAs, and the TDRAs in the fourth list can include respective scheduling offsets from the first scheduling offsets and respective scheduling offsets from the second scheduling offsets. An example is illustrated by FIG. 14. In such embodiments, the indication (e.g., received in block 1620) can indicate, for all TDRAs in the fourth list, whether the first scheduling offsets or the second scheduling offsets should be used, and the first scheduling message (e.g., received in block 1620) can indicate a particular TDRA in the fourth list.

In some embodiments, each first scheduling offset can comprise one or more symbols in a same slot as a scheduling message, and each second scheduling offset can comprise two or more symbols in a same slot as a scheduling message.

In other embodiments, the first scheduling offsets and the second scheduling offsets can be in units of slots, with the second minimum value (i.e., of the second scheduling offsets) being greater than a threshold and the first minimum value (i.e., of the first scheduling offsets) being less than or equal to the threshold. In various embodiments, the threshold can be zero or a parameter value included in the transmitted configuration.

In some of these embodiments, the first scheduling message can include a TDRA index value that corresponds to a particular first scheduling offset and to a particular second scheduling offset. Examples of such arrangements are shown in Tables 4-5 above. In such embodiments, the TDRA index value can also correspond to a start and length indicator value, SLIV, associated with the particular first scheduling offset and with the particular second scheduling offset (e.g., as illustrated in Table 4). Alternatively, the TDRA index value can correspond to a first SLIV associated with the particular first scheduling offset, and to a second SLIV associated with the particular second scheduling offset (e.g., as illustrated in Table 5).

In some embodiments, the second scheduling offsets can be a subset of the first scheduling offsets. As an example, the network can configure the UE with a set of K0 (or K2) offset values that can include zero values and non-zero values. In which case, the entire set can represent the first scheduling offsets (with minimum value zero) and the non-zero subset (with minimum value>0) can represent the second scheduling offsets. In such embodiments, the indication (e.g., transmitted in block 1630) can activate or deactivate the portion of the first scheduling offsets other than the second scheduling offsets (e.g., the zero-valued scheduling offsets).

In various embodiments, the one or more first scheduling offsets and the one or more second scheduling offsets, included in the configuration, can be one of the following:

respective K0 offsets between a scheduling message and a physical downlink shared channel (PDSCH) transmission scheduled by the scheduling message;

respective K2 offsets between a scheduling message and a physical uplink shared channel (PUSCH) transmission scheduled by the scheduling message; and respective aperiodic triggering offsets between a scheduling message and a channel state information reference signal (CSI-RS) transmission scheduled by the scheduling message.

In some embodiments, the indication can indicate that the UE should use the second scheduling offsets, and the configuration can also identify a period following the indication during which the UE should use the second scheduling offsets and after which the UE should use the first scheduling offsets if a further scheduling message has not been received by the UE.

In some embodiments, the exemplary method can also include the operations of block 1640, where the UE can, after receiving or transmitting the first signal or channel, receive a further indication that the UE should use the other of the first and second scheduling offsets, than indicated by the indication, for transmitting or receiving a second signal or channel scheduled by a second scheduling message. For example, if the indication indicated that the UE should use the first scheduling offsets, the further indication can indicate that the UE should use the second scheduling offsets.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 17:
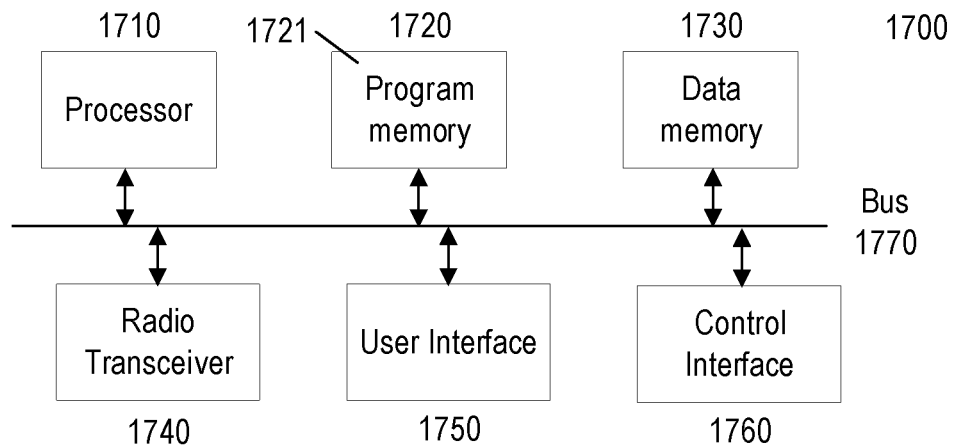
FIG. 17 is a block diagram of an exemplary wireless device or UE according to various exemplary embodiments.

FIG. 17 shows a block diagram of an exemplary wireless device or user equipment (UE) 1700 (hereinafter referred to as "UE 1700") according to various embodiments of the present disclosure, including those described above with reference to other figures. For example, UE 1700 can be configured by execution of instructions, stored on a computer-readable medium, to perform operations corresponding to one or more of the exemplary methods described herein.

UE 1700 can include a processor 1710 (also referred to as "processing circuitry") that can be operably connected to a program memory 1720 and/or a data memory 1730 via a bus 1770 that can comprise parallel address and data buses, serial ports, or other methods and/or structures known to those of ordinary skill in the art. Program memory 1720 can store software code, programs, and/or instructions (collectively shown as computer program product 1721 in FIG. 17) that, when executed by processor 1710, can configure and/or facilitate UE 1700 to perform various operations, including operations corresponding to various exemplary methods described herein. As part of or in addition to such operations, execution of such instructions can configure and/or facilitate UE 1700 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1740, user interface 1750, and/or control interface 1760.

As another example, processor 1710 can execute program code stored in program memory 1720 that corresponds to MAC, RLC, PDCP, and RRC layer protocols standardized by 3GPP (e.g., for NR and/or LTE). As a further example, processor 1710 can execute program code stored in program memory 1720 that, together with radio transceiver 1740, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1710 can execute program code stored in program memory 1720 that, together with radio transceiver 1740, implements device-to-device (D2D) communications with other compatible devices and/or UEs.

Program memory 1720 can also include software code executed by processor 1710 to control the functions of UE 1700, including configuring and controlling various components such as radio transceiver 1740, user interface 1750, and/or control interface 1760. Program memory 1720 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1720 can comprise an external storage arrangement (not shown) remote from UE 1700, from which the instructions can be downloaded into program memory 1720 located within or removably coupled to UE 1700, so as to enable execution of such instructions.

Data memory 1730 can include memory area for processor 1710 to store variables used in protocols, configuration, control, and other functions of UE 1700, including operations corresponding to, or comprising, any of the exemplary methods described herein. Moreover, program memory 1720 and/or data memory 1730 can include non-volatile memory (e.g., flash memory), volatile memory (e.g., static or dynamic RAM), or a combination thereof. Furthermore, data memory 1730 can comprise a memory slot by which removable memory cards in one or more formats (e.g., SD Card, Memory Stick, Compact Flash, etc.) can be inserted and removed.

Persons of ordinary skill will recognize that processor 1710 can include multiple individual processors (including, e.g., multi-core processors), each of which implements a portion of the functionality described above. In such cases, multiple individual processors can be commonly connected to program memory 1720 and data memory 1730 or individually connected to multiple individual program memories and or data memories. More generally, persons of ordinary skill in the art will recognize that various protocols and other functions of UE 1700 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1740 can include radio-frequency transmitter and/or receiver functionality that facilitates the UE 1700 to communicate with other equipment supporting like wireless communication standards and/or protocols. In some exemplary embodiments, the radio transceiver 1740 includes one or more transmitters and one or more receivers that enable UE 1700 to communicate according to various protocols and/or methods proposed for standardization by 3GPP and/or other standards bodies. For example, such functionality can operate cooperatively with processor 1710 to implement a PHY layer based on OFDM, OFDMA, and/or SC-FDMA technologies, such as described herein with respect to other figures.

In some exemplary embodiments, radio transceiver 1740 includes one or more transmitters and one or more receivers that can facilitate the UE 1700 to communicate with various LTE, LTE-Advanced (LTE-A), and/or NR networks according to standards promulgated by 3GPP. In some exemplary embodiments of the present disclosure, the radio transceiver 1740 includes circuitry, firmware, etc. necessary for the UE 1700 to communicate with various NR, NR-U, LTE, LTE-A, LTE-LAA, UMTS, and/or GSM/EDGE networks, also according to 3GPP standards. In some embodiments, radio transceiver 1740 can include circuitry supporting D2D communications between UE 1700 and other compatible devices.

In some embodiments, radio transceiver 1740 includes circuitry, firmware, etc. necessary for the UE 1700 to communicate with various CDMA2000 networks, according to 3GPP2 standards. In some embodiments, the radio transceiver 1740 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1740 can include a transceiver that is capable of wired communication, such as by using IEEE 802.3 Ethernet technology. The functionality particular to each of these embodiments can be coupled with and/or controlled by other circuitry in the UE 1700, such as the processor 1710 executing program code stored in program memory 1720 in conjunction with, and/or supported by, data memory 1730.

User interface 1750 can take various forms depending on the particular embodiment of UE 1700, or can be absent from UE 1700 entirely. In some embodiments, user interface 1750 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1700 can comprise a tablet computing device including a larger touchscreen display. In such embodiments, one or more of the mechanical features of the user interface 1750 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1700 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1700 having a touch screen display are capable of receiving user inputs, such as inputs related to exemplary methods described herein or otherwise known to persons of ordinary skill.

In some embodiments, UE 1700 can include an orientation sensor, which can be used in various ways by features and functions of UE 1700. For example, the UE 1700 can use outputs of the orientation sensor to determine when a user has changed the physical orientation of the UE 1700's touch screen display. An indication signal from the orientation sensor can be available to any application program executing on the UE 1700, such that an application program can change the orientation of a screen display (e.g., from portrait to landscape) automatically when the indication signal indicates an approximate ninety-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1760 of the UE 1700 can take various forms depending on the particular exemplary embodiment of UE 1700 and of the particular interface requirements of other devices that the UE 1700 is intended to communicate with and/or control. For example, the control interface 1760 can comprise an RS-232 interface, a USB interface, an HDMI interface, a Bluetooth interface, an IEEE ("Firewire") interface, an I$^2$C interface, a PCMCIA interface, or the like. In some exemplary embodiments of the present disclosure, control interface 1760 can comprise an IEEE 802.3 Ethernet interface such as described above. In some exemplary embodiments of the present disclosure, the control interface 1760 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1700 can comprise more functionality than is shown in FIG. 17 including, for example, a video and/or still-image camera, microphone, media player and/or recorder, etc. Moreover, radio transceiver 1740 can include circuitry necessary to communicate using additional radio-frequency communication standards including Bluetooth, GPS, and/or others. Moreover, the processor 1710 can execute software code stored in the program memory 1720 to control such additional functionality. For example, directional velocity and/or position estimates output from a GPS receiver can be available to any application program executing on the UE 1700, including any program code corresponding to and/or embodying any exemplary embodiments (e.g., of methods) described herein.

Figure 18:
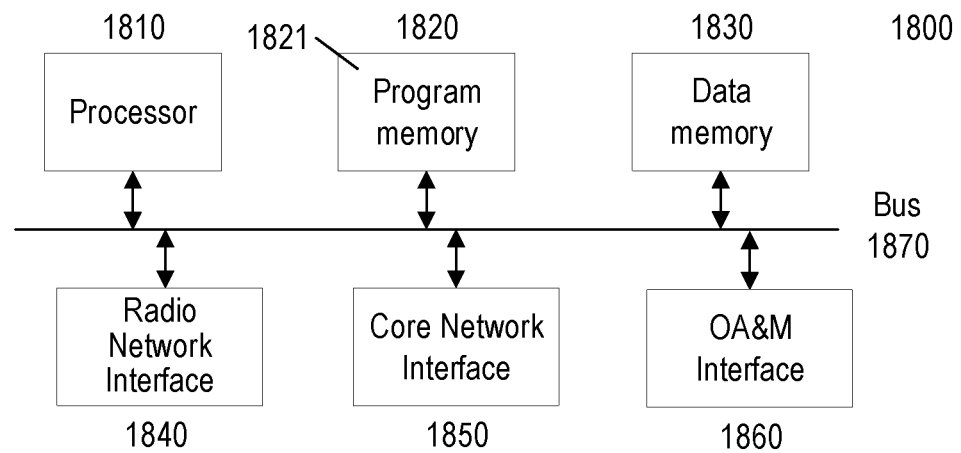
FIG. 18 is a block diagram of an exemplary network node according to various exemplary embodiments.

FIG. 18 shows a block diagram of an exemplary network node 1800 according to various embodiments of the present disclosure, including those described above with reference to other figures. For example, exemplary network node 1800 can be configured by execution of instructions, stored on a computer-readable medium, to perform operations corresponding to one or more of the exemplary methods described herein. In some exemplary embodiments, network node 1800 can comprise a base station, eNB, gNB, or one or more components thereof. For example, network node 1800 can be configured as a central unit (CU) and one or more distributed units (DUs) according to NR gNB architectures specified by 3GPP. More generally, the functionally of network node 1800 can be distributed across various physical devices and/or functional units, modules, etc.

Network node 1800 can include processor 1810 (also referred to as "processing circuitry") that is operably connected to program memory 1820 and data memory 1830 via bus 1870, which can include parallel address and data buses, serial ports, or other methods and/or structures known to those of ordinary skill in the art.

Program memory 1820 can store software code, programs, and/or instructions (collectively shown as computer program product 1821 in FIG. 18) that, when executed by processor 1810, can configure and/or facilitate network node 1800 to perform various operations, including operations corresponding to various exemplary methods described herein. As part of and/or in addition to such operations, program memory 1820 can also include software code executed by processor 1810 that can configure and/or facilitate network node 1800 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1840 and/or core network interface 1850. By way of example, core network interface 1850 can comprise the S1 or NG interface and radio network interface 1840 can comprise the Uu interface, as standardized by 3GPP. Program memory 1820 can also comprise software code executed by processor 1810 to control the functions of network node 1800, including configuring and controlling various components such as radio network interface 1840 and core network interface 1850.

Data memory 1830 can comprise memory area for processor 1810 to store variables used in protocols, configuration, control, and other functions of network node 1800. As such, program memory 1820 and data memory 1830 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1810 can include multiple individual processors (not shown), each of which implements a portion of the functionality described above. In such case, multiple individual processors may be commonly connected to program memory 1820 and data memory 1830 or individually connected to multiple individual program memories and/or data memories. More generally, persons of ordinary skill will recognize that various protocols and other functions of network node 1800 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1840 can comprise transmitters, receivers, signal processors, ASICs, antennas, beamforming units, and other circuitry that enables network node 1800 to communicate with other equipment such as, in some embodiments, a plurality of compatible user equipment (UE). In some embodiments, interface 1840 can also enable network node 1800 to communicate with compatible satellites of a satellite communication network. In some exemplary embodiments, radio network interface 1840 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1840. According to further exemplary embodiments of the present disclosure, the radio network interface 1840 can comprise a PHY layer based on OFDM, OFDMA, and/or SC-FDMA technologies. In some embodiments, the functionality of such a PHY layer can be provided cooperatively by radio network interface 1840 and processor 1810 (including program code in memory 1820).

Core network interface 1850 can comprise transmitters, receivers, and other circuitry that enables network node 1800 to communicate with other equipment in a core network such as, in some embodiments, circuit-switched (CS) and/or packet-switched Core (PS) networks. In some embodiments, core network interface 1850 can comprise the S1 interface standardized by 3GPP. In some embodiments, core network interface 1850 can comprise the NG interface standardized by 3GPP. In some exemplary embodiments, core network interface 1850 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1850 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1800 can include hardware and/or software that configures and/or facilitates network node 1800 to communicate with other network nodes in a RAN, such as with other eNBs, gNBs, ng-eNBs, en-gNBs, IAB nodes, etc. Such hardware and/or software can be part of radio network interface 1840 and/or core network interface 1850, or it can be a separate functional unit (not shown). For example, such hardware and/or software can configure and/or facilitate network node 1800 to communicate with other RAN nodes via the X2 or Xn interfaces, as standardized by 3GPP.

OA&M interface 1860 can comprise transmitters, receivers, and other circuitry that enables network node 1800 to communicate with external networks, computers, databases, and the like for purposes of operations, administration, and maintenance of network node 1800 or other network equipment operably connected thereto. Lower layers of OA&M interface 1860 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1840, core network interface 1850, and OA&M interface 1860 may be multiplexed together on a single physical interface, such as the examples listed above.

Figure 19:
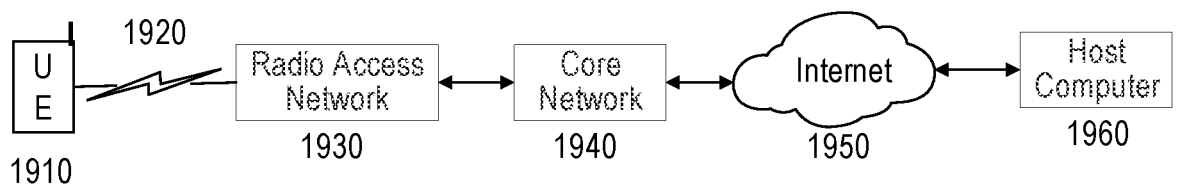
FIG. 19 is a block diagram of an exemplary network configured to provide over-the-top (OTT) data services between a host computer and a UE, according to various exemplary embodiments.

FIG. 19 is a block diagram of an exemplary communication network configured to provide over-the-top (OTT) data services between a host computer and a user equipment (UE), according to one or more exemplary embodiments of the present disclosure. UE 1910 can communicate with radio access network (RAN) 1930 over radio interface 1920, which can be based on protocols described above including, e.g., LTE, LTE-A, and 5G/NR. For example, UE 1910 can be configured and/or arranged as shown in other figures discussed above.

RAN 1930 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1930 can cooperatively operate using licensed and unlicensed spectrum. In some embodiments, RAN 1930 can include, or be capable of communication with, one or more satellites comprising a satellite access network.

RAN 1930 can further communicate with core network 1940 according to various protocols and interfaces described above. For example, one or more apparatus (e.g., base stations, eNBs, gNBs, etc.) comprising RAN 1930 can communicate to core network 1940 via core network interface 1950 described above. In some exemplary embodiments, RAN 1930 and core network 1940 can be configured and/or arranged as shown in other figures discussed above. For example, eNBs comprising an E-UTRAN 1930 can communicate with an EPC core network 1940 via an S1 interface. As another example, gNBs and ng-eNBs comprising an NG-RAN 1930 can communicate with a 5GC core network 1930 via an NG interface.

Core network 1940 can further communicate with an external packet data network, illustrated in FIG. 19 as Internet 1950, according to various protocols and interfaces known to persons of ordinary skill in the art. Many other devices and/or networks can also connect to and communicate via Internet 1950, such as exemplary host computer 1960. In some exemplary embodiments, host computer 1960 can communicate with UE 1910 using Internet 1950, core network 1940, and RAN 1930 as intermediaries. Host computer 1960 can be a server (e.g., an application server) under ownership and/or control of a service provider. Host computer 1960 can be operated by the OTT service provider or by another entity on the service provider's behalf.

For example, host computer 1960 can provide an over-the-top (OTT) packet data service to UE 1910 using facilities of core network 1940 and RAN 1930, which can be unaware of the routing of an outgoing/incoming communication to/from host computer 1960. Similarly, host computer 1960 can be unaware of routing of a transmission from the host computer to the UE, e.g., the routing of the transmission through RAN 1930. Various OTT services can be provided using the exemplary configuration shown in FIG. 19 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 19 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for RAN 1930 to dynamically configure and/or switch UEs (i.e., UEs served by eNBs or gNBs in RAN 1930) between same-slot and cross-slot scheduling for PDSCH and/or PUSCH. When used in NR and/or LTE UEs (e.g., UE 1910) and eNBs and/or gNBs (e.g., comprising RAN 1930), exemplary embodiments described herein can reduce UE power consumption, thereby facilitating such UEs to use their stored energy capacity (e.g., in a battery) for other operations, such as receiving and/or transmitting data via OTT services. Such improvements can result in increased use of such OTT services with less need to recharge UE batteries.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The techniques and apparatus described herein include, but are not limited to, the following enumerated examples:

E1. A method for managing user equipment (UE) energy consumption with respect to receiving physical downlink control channel (PDCCH) transmissions from a network node in a radio access network (RAN), the method comprising:
  transmitting, to the UE, configurations of one or more time-domain resource allocations (TDRAs), wherein the one or more TDRAs include first and second scheduling offsets between a scheduling PDCCH and a corresponding signal or channel scheduled via the scheduling PDCCH, wherein the second scheduling offset is longer than the first scheduling offset;
  subsequently transmitting to the UE:
    a first indication of whether the UE should use the first scheduling offset or the second scheduling offset, and
    a first scheduling PDCCH; and
  after the indicated scheduling offset following the first scheduling PDCCH,
    transmitting or receiving a corresponding first signal or channel scheduled via the first scheduling PDCCH.

E2. The method of example E1, wherein
  the first scheduling offset comprises zero slots; and
  the second scheduling offset comprises one or more slots.

E3. The method of example E1, wherein
  the first scheduling offset comprises a single symbol in the same slot as the first scheduling PDCCH; and
  the second scheduling offset comprises a plurality of symbols in the same slot as the first scheduling PDCCH.

E4. The method of any of examples E1-E3, wherein the configurations of the one or more TDRAs comprise:
  a first list of TDRAs, each having a first scheduling offset; and
  a second list of TDRAs, each having a second scheduling offset.

E5. The method of example E4, wherein the first indication comprises:
  an indication of whether the first list or the second list should be selected; and
  a further indication of a particular TDRA within the selected list.

E6. The method of any of examples E1-E3, wherein the configurations of the one or more TDRAs comprise a list of TDRAs, each entry in the list including:
  a first TDRA having a first scheduling offset; and
  a second TDRA having a second scheduling offset.

E7. The method of example E6, wherein the first indication comprises:
  an indication of a particular entry in the list; and
  for the particular entry, a further indication of whether the first TDRA or the second TDRA should be selected.

E8. The method of any of examples E1-E3, wherein the configurations of the one or more TDRAs comprise a list of TDRAs, each entry in the list including:
  a first scheduling offset; and
  a second scheduling offset.

E9. The method of example E8, wherein the first indication comprises:
  an indication of a particular entry in the list; and
  for the particular entry, a further indication of whether the first scheduling offset or the second scheduling offset should be selected.

E10 The method of any of examples E1-E9, wherein:
  the configurations are transmitted via radio resource control (RRC) message; and
  the first indication comprises one or more of the following:
    a bit field in downlink control information (DCI) within the first scheduling PDCCH;
    a UE identifier within the DCI or the first scheduling PDCCH;
    a format used for the DCI;
    a PDCCH search space in which the first scheduling PDCCH was transmitted;
    a bandwidth part (BWP) in which the first scheduling PDCCH was transmitted;
    a bit field in a medium access control (MAC) control element; and
    a bit field in a RRC message.

E11. The method of example E10, wherein:
  the first indication comprises the bit field in the RRC message; and
  the first scheduling PDCCH comprises a TDRA index value that is associated with values for each of the first scheduling offset and the second scheduling offset.

E12. The method of any of examples E1-E11, wherein both the first and second scheduling offsets are one of the following:
  an offset, k0, between a scheduling PDCCH and a corresponding physical downlink shared channel (PDSCH) transmission;
  an offset, k2, between a scheduling PDCCH and a corresponding physical uplink shared channel (PUSCH) transmission; and
  a aperiodic triggering offset between a scheduling PDCCH and a corresponding channel state information reference signal (CSI-RS) transmission.

E13. The method of any of examples E1-E12, further comprising determining that the UE should use the first scheduling offset based on a data burst to be transmitted to, or received from, the UE, wherein the first indication is based on the determining result.

E14. The method of any of examples E1-E13, further comprising, after transmitting or receiving the corresponding first signal or channel, transmitting a second indication that the UE should use the other of the first and second scheduling offsets than indicated by the first indication.

E15. A method for managing user equipment (UE) energy consumption with respect to receiving physical downlink control channel (PDCCH) transmissions from a network node in a radio access network (RAN), the method comprising:
receiving, from the network node, configurations of one or more time-domain resource allocations (TDRAs), wherein the one or more TDRAs include first and second scheduling offsets between a scheduling PDCCH and a corresponding signal or channel scheduled via the scheduling PDCCH, wherein the second scheduling offset is longer than the first scheduling offset;
subsequently receiving from the network node:
a first indication of whether the UE should use the first scheduling offset or the second scheduling offset, and
a first scheduling PDCCH; and
after the indicated scheduling offset following the first scheduling PDCCH,
transmitting or receiving a corresponding first signal or channel scheduled via the first scheduling PDCCH.

E16. The method of example E15, wherein
the first scheduling offset comprises zero slots; and
the second scheduling offset comprises one or more slots.

E17. The method of example E15, wherein
the first scheduling offset comprises a single symbol in the same slot as the first scheduling PDCCH; and
the second scheduling offset comprises a plurality of symbols in the same slot as the first scheduling PDCCH.

E18. The method of any of examples E15-E17, wherein the configurations of the one or more TDRAs comprise:
a first list of TDRAs, each having a first scheduling offset; and
a second list of TDRAs, each having a second scheduling offset.

E19. The method of example E18, wherein the first indication comprises:
an indication of the first list or the second list should be selected; and
a further indication of a particular TDRA within the selected list.

E20. The method of any of examples E15-E17, wherein the configurations of the one or more TDRAs comprise a list of TDRAs, each entry in the list including:
a first TDRA having a first scheduling offset; and
a second TDRA having a second scheduling offset.

E21. The method of example E20, wherein the first indication comprises:
an indication of a particular entry in the list; and
for the particular entry, a further indication of whether the first TDRA or the second TDRA should be selected.

E22. The method of any of examples E15-E17, wherein the configurations of the one or more TDRAs comprise a list of TDRAs, each entry in the list including:
a first scheduling offset; and
a second scheduling offset.

E23. The method of example E22, wherein the first indication comprises:
an indication of a particular entry in the list; and
for the particular entry, a further indication of whether the first scheduling offset or the second scheduling offset should be selected.

E24. The method of any of examples E15-E23, wherein:
the configurations are received via radio resource control (RRC) message; and
the first indication comprises one or more of the following:
a bit field in downlink control information (DCI) within the first scheduling PDCCH;
a UE identifier within the DCI or the first scheduling PDCCH;
a format used for the DCI;
a PDCCH search space in which the first scheduling PDCCH was received;
a bandwidth part (BWP) in which the first scheduling PDCCH was received;
a bit field in a medium access control (MAC) control element; and
a bit field in a RRC message.

E25. The method of example E24, wherein:
the first indication comprises the bit field in the RRC message; and
the first scheduling PDCCH comprises a TDRA index value that is associated with values for each of the first scheduling offset and the second scheduling offset.

E26. The method of any of examples E15-E25, wherein both the first and second scheduling offsets are one of the following:
an offset, k0, between a scheduling PDCCH and a corresponding physical downlink shared channel (PDSCH) transmission;
an offset, k2, between a scheduling PDCCH and a corresponding physical uplink shared channel (PUSCH) transmission; and
a aperiodic triggering offset between a scheduling PDCCH and a corresponding channel state information reference signal (CSI-RS) transmission.

E27. The method of any of examples E14-E24, further comprising, after transmitting or receiving the corresponding first signal or channel, receiving a second indication that the UE should use the other of the first and second scheduling offsets than indicated by the first indication.

E28. A network node, in a radio access network (RAN), configured to manage user equipment (UE) energy consumption with respect to physical downlink control channel (PDCCH) transmissions from the network node, wherein the network node comprises:
radio network interface circuitry configured to communicate with the one or more UEs; and
processing circuitry operatively associated with the radio network interface circuitry, whereby the combination of the processing circuitry and the radio network interface circuitry is configured to perform operations corresponding to any of the methods of examples E1-E14.

E29. A network node, in a radio access network (RAN), configured to manage user equipment (UE) energy consumption with respect to physical downlink control channel (PDCCH) transmissions, the network node being arranged to perform operations corresponding to any of the methods of examples E1-E14.

E30. A non-transitory, computer-readable medium storing computer-executable instructions that, when executed by at least one processor of a network node, configure the network node to perform operations corresponding to any of the methods of examples E1-E14.

E31. A computer program product comprising computer-executable instructions that, when executed by at least one processor of a network node, configure the network node to perform operations corresponding to any of the methods of examples E1-E14.

E32. A user equipment (UE) configured to manage energy consumption with respect to receiving physical downlink control channel (PDCCH) transmissions from a network node in a radio access network (RAN), the UE comprising:
transceiver circuitry configured to communicate with a network node; and
processing circuitry operatively associated with the transceiver circuitry, whereby the combination of the processing circuitry and the transceiver circuitry is configured to perform operations corresponding to any of the methods of examples E15-E27.

E33. A user equipment (UE) configured to manage energy consumption with respect to receiving physical downlink control channel (PDCCH) transmissions from a network node in a radio access network (RAN), the UE being arranged to perform operations corresponding to any of the methods of examples E15-E27.

E34. A non-transitory, computer-readable medium storing computer-executable instructions that, when executed by at least one processor of a user equipment (UE), configure the UE to perform operations corresponding to any of the methods of examples E15-E27.

E35. A computer program product comprising computer-executable instructions that, when executed by at least one processor of a user equipment (UE), configure the UE to perform operations corresponding to any of the methods of examples E15-E27.

The invention claimed is:

1. A method, performed by a network node of a wireless network, for scheduling user equipment (UEs) served by the network node, the method comprising:
transmitting, to a UE, a configuration including one or more time-domain resource allocations (TDRAs), wherein:
the one or more TDRAs each include a first scheduling offset and a second scheduling offset between a scheduling message and a signal or channel scheduled via the scheduling message, and
a second minimum value of the second scheduling offsets is greater than a first minimum value of the first scheduling offsets; and
subsequently transmitting to the UE:
an indication of whether the UE should use the first scheduling offsets or the second scheduling offsets, and
a first scheduling message that schedules a first signal or channel for the UE according to the indication, wherein:
the first scheduling message is transmitted as downlink control information (DCI) in a physical downlink control channel (PDCCH);
the indication is a type of radio network temporary identifier (RNTI) used to scramble a cyclic redundancy check (CRC) of the DCI;
a paging RNTI indicates that the UE should use the second scheduling offsets; and
a non-paging RNTI indicates that the UE should use the first scheduling offsets.

2. The method of claim 1, further comprising transmitting or receiving the first signal or channel at one of the first scheduling offsets or one of the second scheduling offsets after transmitting the first scheduling message, in accordance with the indication.

3. The method of claim 1, wherein:
the one or more TDRAs are included in a list of a plurality of TDRAs; and
the TDRAs in the list include respective scheduling offsets from the first scheduling offsets and respective scheduling offsets from the second scheduling offsets.

4. The method of claim 3, wherein:
the indication indicates, for all TDRAs in the list, whether the first scheduling offsets or the second scheduling offsets should be used; and
the first scheduling message indicates a particular TDRA in the list.

5. The method of claim 1, wherein
the configuration is transmitted in a radio resource control (RRC) message.

6. The method of claim 1, wherein:
the first scheduling offsets and the second scheduling offsets are in units of slots;
the second minimum value is greater than a threshold; and
the first minimum value is less than or equal to the threshold.

7. The method of claim 6, wherein the threshold is one of the following: zero or a parameter value included in the transmitted configuration.

8. The method of claim 6, wherein the first scheduling message includes a TDRA index value that corresponds to a particular first scheduling offset and to a particular second scheduling offset.

9. The method of claim 8, wherein the TDRA index value also corresponds to one of the following:
a start and length indicator value (SLIV) associated with both the particular first scheduling offset and the particular second scheduling offset; or
a first SLIV associated with the particular first scheduling offset, and a second SLIV associated with the particular second scheduling offset.

10. The method of claim 1, wherein:
each first scheduling offset comprises one or more symbols in a same slot as a scheduling message; and
each second scheduling offset comprises two or more symbols in a same slot as a scheduling message.

11. The method of claim 1, wherein the first scheduling offsets and the second scheduling offsets, included in the configuration, are one of the following:
respective K0 offsets between a scheduling message and a physical downlink shared channel (PDSCH) transmission scheduled by the scheduling message;
respective K2 offsets between a scheduling message and a physical uplink shared channel (PUSCH) transmission scheduled by the scheduling message; or
respective aperiodic triggering offsets between a scheduling message and a channel state information reference signal (CSI-RS) transmission scheduled by the scheduling message.

12. The method of claim 1, wherein:
the indication indicates that the UE should use the second scheduling offsets; and
the configuration also identifies a period, following the indication, during which the UE should use the second scheduling offsets and after which the UE should use the first scheduling offsets if a further scheduling message has not been received by the UE.

13. The method of claim 1, further comprising determining whether the UE should use the first scheduling offsets or the second scheduling offsets based on an amount of data needing to be transmitted to, or received from, the UE.

14. The method of claim 1, further comprising, after transmitting or receiving the first signal or channel, transmitting a further indication that the UE should use the other of the first and second scheduling offsets, than indicated by the indication, for transmitting or receiving a second signal or channel scheduled by a second scheduling message.

15. A method performed by a user equipment (UE) configured for operation in a wireless network, the method comprising:
receiving, from a network node serving the UE in the wireless network, a configuration including one or more time-domain resource allocations (TDRAs), wherein:
the one or more TDRAs each include a first scheduling offset and a second scheduling offset between a scheduling message and a signal or channel scheduled via the scheduling message, and
a second minimum value of the second scheduling offsets is greater than a first minimum value of the first scheduling offsets; and
subsequently receiving from the network node:
an indication of whether the UE should use the first scheduling offsets or the second scheduling offsets, and
a first scheduling message that schedules a first signal or channel for the UE according to the indication, wherein:
the first scheduling message is received as downlink control information (DCI) in a physical downlink control channel (PDCCH);
the indication is a type of radio network temporary identifier (RNTI) used to scramble a cyclic redundancy check (CRC) of the DCI;
a paging RNTI indicates that the UE should use the second scheduling offsets; and
a non-paging RNTI indicates that the UE should use the first scheduling offsets.

16. The method of claim 15, further comprising receiving or transmitting the first signal or channel at one of the first scheduling offsets or one of the second scheduling offsets after receiving the first scheduling message, in accordance with the indication.

17. The method of claim 15, wherein:
the one or more TDRAs are included in a list of a plurality of TDRAs; and
the TDRAs in the list include respective scheduling offsets from the first scheduling offsets and respective scheduling offsets from the second scheduling offsets.

18. The method of claim 17, wherein:
the indication indicates, for all TDRAs in the list, whether the first scheduling offsets or the second scheduling offsets should be used; and
the first scheduling message indicates a particular TDRA in the list.

19. The method of claim 15, wherein
the configuration is received in a radio resource control (RRC) message.

20. The method of claim 15, wherein:
the first scheduling offsets and the second scheduling offsets are in units of slots;
the second minimum value is greater than a threshold; and
the first minimum value is less than or equal to the threshold.

21. The method of claim 20, wherein the threshold is one of the following: zero, or a parameter value included in the transmitted configuration.

22. The method of claim 15, wherein the first scheduling message includes a TDRA index value that corresponds to a particular first scheduling offset and to a particular second scheduling offset.

23. The method of claim 22, wherein the TDRA index value also corresponds to one of the following:
a start and length indicator value (SLIV) associated with both the particular first scheduling offset and the particular second scheduling offset; or
a first SLIV associated with the particular first scheduling offset, and a second SLIV associated with the particular second scheduling offset.

24. The method of claim 15, wherein:
each first scheduling offset comprises one or more symbols in a same slot as a scheduling message; and
each second scheduling offset comprises two or more symbols in a same slot as a scheduling message.

* * * * *